United States Patent
Balassanian

(10) Patent No.: US 10,027,780 B2
(45) Date of Patent: *Jul. 17, 2018

(54) METHOD AND SYSTEM FOR DATA DEMULTIPLEXING

(71) Applicant: Implicit, LLC, Seattle, WA (US)

(72) Inventor: Edward Balassanian, Seattle, WA (US)

(73) Assignee: Implicit, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,964

(22) Filed: Sep. 13, 2017

(65) Prior Publication Data

US 2018/0013865 A1    Jan. 11, 2018

Related U.S. Application Data

(63) Continuation of application No. 15/450,790, filed on Mar. 6, 2017, which is a continuation of application
(Continued)

(51) Int. Cl.
*H04L 12/58* (2006.01)
*H04L 29/06* (2006.01)
(Continued)

(52) U.S. Cl.
CPC .............. *H04L 69/08* (2013.01); *H04L 29/06* (2013.01); *H04L 45/00* (2013.01);
(Continued)

(58) Field of Classification Search
None
See application file for complete search history.

(56) References Cited

U.S. PATENT DOCUMENTS 5,298,674 A    3/1994 Yun
5,392,390 A    2/1995 Crozier
(Continued)

FOREIGN PATENT DOCUMENTS

EP    0408132    1/1991
EP    0807347    11/1997
(Continued)

OTHER PUBLICATIONS

Non-Final Office Action in Inter Partes Reexamination Control No. 95/000,659 dated Aug. 16, 2013, 107 pages.
(Continued)

*Primary Examiner* — Duc T Duong
(74) *Attorney, Agent, or Firm* — Meyertons, Hood, Kivlin, Kowert & Goetzel, P.C.

(57) ABSTRACT

A method and system for demultiplexing packets of a message is provided.
The demultiplexing system receives packets of a message, identifies a sequence of message handlers for processing the message, identifies state information associated with the message for each message handler, and invokes the message handlers passing the message and the associated state information. The system identifies the message handlers based on the initial data type of the message and a target data type. The identified message handlers effect the conversion of the data to the target data type through various intermediate data types.

20 Claims, 16 Drawing Sheets

Related U.S. Application Data

No. 15/050,027, filed on Feb. 22, 2016, now Pat. No. 9,591,104, which is a continuation of application No. 14/230,952, filed on Mar. 31, 2014, now Pat. No. 9,270,790, which is a continuation of application No. 13/911,324, filed on Jun. 6, 2013, now Pat. No. 8,694,683, which is a continuation of application No. 13/236,090, filed on Sep. 19, 2011, now abandoned, which is a continuation of application No. 10/636,314, filed on Aug. 6, 2003, now Pat. No. 8,055,786, which is a continuation of application No. 09/474,664, filed on Dec. 29, 1999, now Pat. No. 8,629,163.

(51) Int. Cl.
| | | |
|---|---|---|
| *H04L 29/08* | (2006.01) | |
| *H04L 29/12* | (2006.01) | |
| *H04L 12/701* | (2013.01) | |

(52) U.S. Cl.
CPC ...... *H04L 61/2007* (2013.01); *H04L 61/6063* (2013.01); *H04L 67/02* (2013.01); *H04L 69/16* (2013.01); *H04L 69/18* (2013.01); *H04L 69/22* (2013.01); *H04L 69/32* (2013.01)

(56) References Cited

U.S. PATENT DOCUMENTS

| | | |
|---|---|---|
| 5,414,833 A | 5/1995 | Hershey et al. |
| 5,425,029 A | 6/1995 | Hluchyj et al. |
| 5,568,478 A | 10/1996 | van Loo, Jr. et al. |
| 5,627,997 A | 5/1997 | Pearson et al. |
| 5,710,917 A | 1/1998 | Musa et al. |
| 5,727,159 A | 3/1998 | Kikinis |
| 5,740,430 A | 4/1998 | Rosenberg et al. |
| 5,761,651 A | 6/1998 | Hasebe |
| 5,768,521 A | 6/1998 | Dedrick |
| 5,826,027 A | 10/1998 | Pedersen et al. |
| 5,835,726 A | 11/1998 | Shwed et al. |
| 5,842,040 A | 11/1998 | Hughes et al. |
| 5,848,233 A | 12/1998 | Radia et al. |
| 5,848,246 A | 12/1998 | Gish |
| 5,848,415 A | 12/1998 | Guck |
| 5,854,899 A | 12/1998 | Callon et al. |
| 5,870,479 A | 2/1999 | Feiken et al. |
| 5,896,383 A | 4/1999 | Wakeland |
| 5,898,830 A | 4/1999 | Wesinger, Jr. et al. |
| 5,918,013 A | 6/1999 | Mighdoll et al. |
| 5,983,348 A | 11/1999 | Ji |
| 5,987,256 A | 11/1999 | Wu et al. |
| 5,991,299 A | 11/1999 | Radogna et al. |
| 5,991,806 A | 11/1999 | McHann, Jr. |
| 6,032,150 A | 2/2000 | Nguyen |
| 6,035,339 A | 3/2000 | Agraharam et al. |
| 6,047,002 A | 4/2000 | Hartmann et al. |
| 6,067,575 A | 5/2000 | McManis et al. |
| 6,091,725 A | 7/2000 | Cheriton et al. |
| 6,094,679 A | 7/2000 | Teng et al. |
| 6,101,189 A | 8/2000 | Tsuruoka |
| 6,101,320 A | 8/2000 | Schuetze et al. |
| 6,104,500 A | 8/2000 | Alam et al. |
| 6,104,704 A | 8/2000 | Buhler et al. |
| 6,111,893 A | 8/2000 | Volftsun et al. |
| 6,112,250 A | 8/2000 | Appelman |
| 6,115,393 A | 9/2000 | Engel et al. |
| 6,119,165 A | 9/2000 | Li et al. |
| 6,119,236 A | 9/2000 | Shipley |
| 6,122,666 A | 9/2000 | Beurket et al. |
| 6,128,624 A | 10/2000 | Papiernak et al. |
| 6,130,917 A | 10/2000 | Monroe |
| 6,141,749 A | 10/2000 | Coss et al. |
| 6,151,390 A | 11/2000 | Volftsun et al. |
| 6,157,622 A | 12/2000 | Tanaka et al. |
| 6,167,441 A | 12/2000 | Himmel |
| 6,192,419 B1 | 2/2001 | Aditham et al. |
| 6,199,054 B1 | 3/2001 | Khan et al. |
| 6,212,550 B1 | 4/2001 | Segur |
| 6,222,536 B1 | 4/2001 | Kihl et al. |
| 6,226,267 B1 | 5/2001 | Spinney et al. |
| 6,243,667 B1 | 6/2001 | Kerr et al. |
| 6,246,678 B1 | 6/2001 | Erb et al. |
| 6,259,781 B1 | 7/2001 | Crouch et al. |
| 6,275,507 B1 | 8/2001 | Anderson et al. |
| 6,278,532 B1 | 8/2001 | Heimendinger et al. |
| 6,292,827 B1 | 9/2001 | Raz |
| 6,356,529 B1 | 3/2002 | Zarom |
| 6,359,911 B1 | 3/2002 | Movshovich et al. |
| 6,374,305 B1 | 4/2002 | Gupta et al. |
| 6,401,132 B1 | 6/2002 | Bellwood et al. |
| 6,404,775 B1 | 6/2002 | Leslie et al. |
| 6,405,254 B1 | 6/2002 | Hadland |
| 6,426,943 B1 | 7/2002 | Spinney et al. |
| 6,427,171 B1 * | 7/2002 | Craft ................. H04L 29/06 709/230 |
| 6,493,348 B1 | 12/2002 | Gelman et al. |
| 6,504,843 B1 | 1/2003 | Cremin et al. |
| 6,519,636 B2 | 2/2003 | Engel et al. |
| 6,560,236 B1 | 5/2003 | Varghese et al. |
| 6,574,610 B1 | 6/2003 | Clayton et al. |
| 6,578,084 B1 | 6/2003 | Moberg et al. |
| 6,598,034 B1 | 7/2003 | Kloth |
| 6,629,163 B1 | 9/2003 | Balassanian |
| 6,650,632 B1 | 11/2003 | Volftsun et al. |
| 6,651,099 B1 | 11/2003 | Dietz et al. |
| 6,678,518 B2 | 1/2004 | Eerola |
| 6,680,922 B1 | 1/2004 | Jorgensen |
| 6,701,432 B1 | 3/2004 | Deng et al. |
| 6,711,166 B1 | 3/2004 | Amir et al. |
| 6,772,413 B2 | 8/2004 | Kuznetsov |
| 6,785,730 B1 | 8/2004 | Taylor |
| 6,865,735 B1 | 3/2005 | Sirer et al. |
| 6,871,179 B1 | 3/2005 | Kist et al. |
| 6,889,181 B2 | 5/2005 | Kerr et al. |
| 6,937,574 B1 | 8/2005 | Delaney et al. |
| 6,957,346 B1 | 10/2005 | Kivinen et al. |
| 6,959,439 B1 | 10/2005 | Boike |
| 7,233,569 B1 * | 6/2007 | Swallow ............. H04L 12/4633 370/225 |
| 7,233,948 B1 | 6/2007 | Shamoon et al. |
| 7,281,036 B1 | 10/2007 | Lu et al. |
| 7,383,341 B1 | 6/2008 | Saito et al. |
| 7,711,857 B2 | 5/2010 | Balassanian |
| 8,055,786 B2 | 11/2011 | Balassanian |
| 8,694,683 B2 | 4/2014 | Balassanian |
| 2003/0142669 A1 | 7/2003 | Kubota et al. |
| 2004/0015609 A1 | 1/2004 | Brown et al. |
| 2008/0250045 A1 * | 10/2008 | Balassanian ...... G06F 17/30569 |
| 2009/0083763 A1 | 3/2009 | Sareen et al. |
| 2009/0265695 A1 | 10/2009 | Karino |
| 2017/0237668 A1 * | 8/2017 | Hall .................. H04L 47/193 370/235 |

FOREIGN PATENT DOCUMENTS

| | | |
|---|---|---|
| EP | 0817031 | 1/1998 |
| JP | H10-49354 | 2/1998 |
| JP | H10-55279 | 2/1998 |
| JP | H10-74153 | 3/1998 |
| JP | H10-289215 | 10/1998 |
| WO | 99/35799 | 7/1999 |

OTHER PUBLICATIONS

Decision on Petition in Reexamination Control No. 95/000,659 dated Aug. 19, 2013, 3 pages.
Response to Non-Final Office Action in Reexamination Control No. 95/000,659 dated Oct. 2, 2013 including Exhibits A-C, 37 pages.
Decision on Petition in Reexamination Control No. 95/000,660 dated Jul. 30, 2013, 12 pages.
Non-Final Office Action in Inter Partes Reexamination Control No. 95/000,660 dated Aug. 30, 2013, 23 pages.

(56) References Cited

OTHER PUBLICATIONS

RFC: 791. Internet Protocol: DARPA Internet Program Protocol Specification, Sep. 1981, prepared for Defense Advanced Research Projects Agency Information Processing Techniques Office by Information Sciences Institute University of Southern California, 52 pages.

2015 WL 2194627, United States District Court, N.D. California, *Implicit L.L.C.*, Plaintiff, v. *F5 Networks, Inc.*, Defendant, Case No. 14-cv-02856-SI, signed May 6, 2015, 14 pages.

Defendants' Invalidity Contentions Pursuant to Local Patent Rules 3-3 and 3-4, United States District Court Eastern District of Texas Tyler Division, *Implicit, LLC* v. *Trend Micro, Inc., Ericsson Inc., Huawei Technologies USA, Inc., NEC Corporation of America, Nokia Solutions and Networks US LLC*; Sep. 2, 2016, 53 pages.

Exhibits A-1-A16 Invalidity of U.S. Pat. No. 8,694,683, Defendants' Invalidity Contentions Pursuant to Local Patent Rules 3-3 and 3-4, United States District Court Eastern District of Texas Tyler Division, Sep. 2, 2016, 425 pages.

Exhibits B-1-B13 Invalidity of U.S. Pat. No. 9,270,790, Defendants' Invalidity Contentions Pursuant to Local Patent Rules 3-3 and 3-4, United States District Court Eastern District of Texas Tyler Division, Sep. 2, 2016, 369 pages.

Exhibits C-1-C21 Invalidity of U.S. Pat. No. 8,856,779, Defendants' Invalidity Contentions Pursuant to Local Patent Rules 3-3 and 3-4, United States District Court Eastern District of Texas Tyler Division, Sep. 2, 2016, 646 pages.

Exhibits D-1-D21 Invalidity of U.S. Pat. No. 9,325,740, Defendants' Invalidity Contentions Pursuant to Local Patent Rules 3-3 and 3-4, United States District Court Eastern District of Texas Tyler Division, Sep. 2, 2016, 419 pages.

Exhibits E-1-E20 Invalidity of U.S. Pat. No. 6,324,685, Defendants' Invalidity Contentions Pursuant to Local Patent Rules 3-3 and 3-4, United States District Court Eastern District of Texas Tyler Division, Sep. 2, 2016, 416 pages.

Michael Baentsch, et al., "WebMake: Integrating distributed software development in a structure-enhanced Web," Computer Networks and ISDN Systems 27 (1995), pp. 789-800.

Dan Decasper, et al., "A Scalable, High Performance Active Network Node," Apr. 1998, 21 pages.

John J. Hartman, et al., "Joust: A Platform for Liquid Software," Computer, IEEE, 1999, pp. 50-56.

David Mosberger, et al., "Making Paths Explicit in the Scout Operating System," Proceedings of the USENIX 2nd Symposium on Operating Systems Design and Implementation, Oct. 1996, 16 pages.

Oliver Spatscheck, et al., "Escort: A Path-Based OS Security Architecture," TR 97-17, Nov. 26, 1997, 17 pages.

Dan Decasper, et al., "DAN: Distrubuted Code Caching for Active Networks," IEEE, 1998, pp. 609-616.

Alexander, D. et al., "The SwitchWare Active Network Architecture", Jun. 6, 1998, IEEE.

Antoniazzi, S. et al., "An Open Software Architecture for Multimedia Consumer Terminals", Central Research Labs, Italy; Alcatel SEL Research Centre, Germany, ECMAST 1997.

Arbanowski, Stefan, "Generic Description of Telecommunication Services and Dynamic Resource Selection in Intelligent Communication Environments", Thesis, Technische Universitat Berlin, Oct. 9, 1996, (3 documents).

Arbanowski, S., et al., Service Personalization for Unified Messaging Systems, Jul. 6-8, 1999, The Fourth IEEE Symposium on Computers and Communications, ISCC '99, Red Sea, Egypt.

Atkinson, R., "Security Architecture for the Internet Protocol", Aug. 1995, Naval Research Laboratory.

Atkinson, R., "IP Authentication Header", Aug. 1995, Naval Research Laboratory.

Atkinson, R., "IP Encapsulating Security Payload (ESP)", Aug. 1995, Naval Research Laboratory.

Back, G., et al., Java Operating Systems: Design and Implementation, Aug. 1998, Technical Report UUCS-98-015, University of Utah.

Baker, Dr. Sean, "CORBA Implementation Issues", 1994, IONA Technologies, O'Reilly Institute Dublin, Ireland.

Barrett, R., et al., "Intermediaries: New Places for Producing and Manipulating Web Content", 1998, IBM Almaden Research Center, Elsevier Science.

Bellare, M., et al., "A Concrete Security Treatment of Symmetric Encryption: Analysis of the DES Modes of Operation", Aug. 15, 1997, Dept. of Computer Science and Engineering, University of California, San Diego.

Bellare, M., et al., "A Concrete Security Treatment of Symmetric Encryption: Analysis of the DES Modes of Operation", Aug. 15, 1997, IEEE.

Bellare, M., et al., "XOR MACs: New Methods for Message Authentication Using Finite Pseudorandom Functions", 1995, CRYPTO '95, LNCS 963, pp. 15-28, Springer-Verlag Berlin Heidelberg.

Bellissard, L., et al., "Dynamic Reconfiguration of Agent-Based Applications", Third European Research Seminar on Advances in Distributed Systems, (ERSADS '99) Madeira Island.

Bolding, Darren, "Network Security, Filters and Firewalls", 1995, www.acm.org/crossroads/xrds2-I/security.html.

Booch, G., et al., "Software Engineering with ADA", 1994, Third Edition, The Benjamin/Cummings Publishing Company, Inc., (2 documents).

Breugst, et al., "Mobile Agents—Enabling Technology for Active Intelligent Network Implementation", May/Jun. 1998, IEEE Network.

"C Library Functions", AUTH(3) Sep. 17, 1993, Solbourne Computer, Inc.

Chapman, D., et al., "Building Internet Firewalls", Sep. 1995, O'Reilly & Associates, Inc.

CheckPoint FireWall-1 Technical White Paper, Jul. 18, 1994, CheckPoint Software Technologies, Ltd.

CheckPoint FireWall-1 White Paper, Sep. 1995, Version 2.0, CheckPoint Software Technologies, Ltd.

Command Line Interface Guide P/N 093-0011-000 Rev C Version 2.5, 2000-2001, NetScreen Technologies, Inc.

Coulson, G. et al., "A CORBA Compliant Real-Time Multimedia Platform for Broadband Networks", Lecture Notes in Computer Science, 1996, Trends in Distributed Systems CORBA and Beyond.

Cox, Brad, "SuperDistribution, Objects As Property on the Electronic Frontier", 1996, Addison-Wesley Publishing Company.

Cranes, et al., "A Configurable Protocol Architecture for CORBA Environments", Autonomous Decentralized Systems 1997 Proceedings ISADS, Third International Symposium Apr. 9-11, 1997.

Curran, K., et al., "CORBA Lacks Venom", University of Ulster, Northern Ireland, UK 2000.

Dannert, Andreas, "Call Logic Service for a Personal Communication Supporting System", Thesis, Jan. 20, 1998, Technische Universitat Berlin.

DARPA Internet Program Protocol Specification, "Transmission Control Protocol", Sep. 1981, Information Sciences Institute, California.

DARPA Internet Program Protocol Specification, "Internet Protocol", Sep. 1981, Information Sciences Institute, California.

Decasper, D., et al., "Crossbow: A Toolkit for Integrated Services over Cell Switched IPv6", 1997, Computer Engineering and Networks Laboratory, ETH Zurich, Switzerland.

Decasper, D., et al., "Router Plugins a Software Architecture for Next Generation Routers", 1998, Proceedings of ACM SIGCONM '98.

Deering, S., et al., Internet Protocol, Version 6 (IPv6) Specification, Dec. 1998, Nokia, The Internet Society.

Deering, S., et al., Internet Protocol, Version 6 (IPv6) Specification, Dec. 1995, Network Working Group, RFC 1883.

Dutton, et al, "Asynchronous Transfer Mode Technical Overview (ATM)", Second Edition; IBM, Oct. 1995, $2^{nd}$ Edition, Prentice Hall PTR, USA.

Eckardt, T., et al., "Application of X.500 and X.700 Standards for Supporting Personal Communications in Distributed Computing Environments", 1995, IEEE.

(56) References Cited

OTHER PUBLICATIONS

Eckardt, T., et al., "Personal Communications Support based on TMN and TINA Concepts", 1996, IEEE Intelligent Network Workshop (IN '96), Apr. 21-24, Melbourne, Australia.
Eckardt, T., et al., "Beyond IN and UPT—A Personal Communications Support System Based on TMN Concepts", Sep. 1997, IEEE Journal on Selected Areas in Communications, vol. 15, No. 7.
Egevang, K., et al., "The IP Network Address Translator (NAT)", May 1994, Network Working Group, RFC 1631.
Estrin, D., et al., "Visa Protocols for Controlling Inter-Organizational Datagram Flow", Dec. 1998, Computer Science Department, University of Southern California and Digital Equipment Corporation.
Faupel, M., "Java Distribution and Deployment", Oct. 9, 1997, APM Ltd., United Kingdom.
Felber, P., "The CORBA Object Group Service: A Service Approach to Object Groups in CORBA", Thesis, 1998, Ecole Polytechnique Federale de Lausanne, Switzerland.
Fish, R., et al., "DRoPS: Kernel Support for Runtime Adaptable Protocols", Aug. 25-27, 1998, IEEE $24^{th}$ Euromicro Conference, Sweden.
Fiuczynski, M., et al., "An Extensible Protocol Architecture for Application-Specific Networking", 1996, Department of Computer Science and Engineering, University of Washington.
Franz, Stefan, "Job and Stream Control in Heterogeneous Hardware and Software Architectures", Apr. 1998, Technische Universitat, Berlin, (2 documents).
Fraser, T., "DTE Firewalls: Phase Two Measurement and Evaluation Report", Jul. 22, 1997, Trusted Information Systems, USA.
Gazis, V., et al., "A Survey of Dynamically Adaptable Protocol Stacks", first Quarter 2010, IEEE Communications Surveys & Tutorials, vol. 12, No. 1, $1^{st}$ Quarter.
Gokhale, A., et al., "Evaluating the Performance of Demultiplexing Strategies for Real-Time CORBA", Nov. 1997, GLOBECOM.
Gokhale, A., et al., "Measuring and Optimizing CORBA Latency and Scalability Over High-Speed Networks", Apr. 1998, IEEE Transaction on Computers, vol. 47, No. 4; Proceedings of the International Conference on Distributed Computing Systems (ICDCS '97) May 27-30, 1997.
Gokhale, A., et al., "Operating System Support for High-Performance, Real-Time CORBA", 1996.
Gokhale, A., et al., "Principles for Optimizing CORBA Internet Inter-ORB Protocol Performance", Jan. 9, 1998, Proceedings of the HICSS Conference, Hawaii.
Gong, Li, "Java Security: Present and Near Future", May/Jun. 1997, IEEE Micro.
Gong, Li, "New Security Architectural Directions for Java (Extended Abstract)", Dec. 19, 1996, IEEE.
Gong, Li, "Secure Java Class Loading", Nov./Dec. 1998, IEEE Internet.
Goos, G., et al., "Lecture Notes in Computer Science: Mobile Agents and Security", 1998, Springer-Verlag Berlin Heidelberg.
Goralski, W., "Introduction to ATM Networking", 1995, McGraw-Hill Series on Computer Communications, USA.
Hamzeh, K., et al., "Layer Two Tunneling Protocol L2TP", Jan. 1998, PPP Working Group, Internet Draft.
Harrison, T., et al., "The Design and Performance of a Real-Time CORBA Event Service", Aug. 8, 1997,Proceedings of the OOPSLA '97 Conference, Atlanta, Georgia in Oct. 1997.
Huitema, Christian, "IPv6 the New Internet Protocol", 1997 Prentice Hall, Second Edition.
Hutchins, J., et al., "Enhanced Internet Firewall Design Using Stateful Filters Final Report", Aug. 1997, Sandia Report; Sandia National Laboratories.
IBM, Local Area Network Concepts and Products: Routers and Gateways, May 1996.
Juniper Networks Press Release, Juniper Networks Announces Junos, First Routing Operating System for High-Growth Internet Backbone Networks, Jul. 1, 1998, Juniper Networks.
Juniper Networks Press Release, Juniper Networks Ships the Industry's First Internet Backbone Router Delivering Unrivaled Scalability, Control and Performance, Sep. 16, 1998, Juniper Networks.
Karn, P., et al., "The ESP DES-CBC Transform", Aug. 1995, Network Working Group, RFC 1829.
Kelsey, J. et al., "Authenticating Outputs of Computer Software Using a Cryptographic Coprocessor", Sep. 1996, Cardis.
Krieger, D., et al., "The Emergence of Distributed Component Platforms", Mar. 1998, IEEE.
Krupczak, B., et al., "Implementing Communication Protocols in Java", Oct. 1998, IEEE Communications Magazine.
Krupczak, B., et al., "Implementing Protocols in Java: The Price of Portability", 1998, IEEE.
Lawson, Stephen, "Cisco NetFlow Switching Speeds Traffic Routing", Jul. 7, 1997, Infoworld.
Li, S., et al., "Active Gateway: A Facility for Video Conferencing Traffic Control", Feb. 1, 1997, Purdue University; Purdue e-Pubs; Computer Science Technical Reports.
Magedanz, T., et al., "Intelligent Agents: An Emerging Technology for Next Generation Telecommunications?", 1996, IEEE.
Mills, H., et al., "Principles of Information Systems Analysis and Design", 1986, Academic Press, Inc., (2 documents).
Mosberger, David, "*Scout: A Path-Based Operating System*", Doctoral Dissertation Submitted to the University of Arizona, 1997, (3 documents).
Muhugusa, M., et al., "ComScript : An Environment for the Implementation of Protocol Stacks and their Dynamic Reconfiguration", Dec. 1994.
Nelson, M., et al., The Data Compression Book, $2^{nd}$ Edition, 1996, M&T Books, a division of MIS Press, Inc.
NetRanger User's Guide, 1996, WheelGroup Corporation.
NetScreen Command Line Reference Guide, 2000, P/N 093-0000-001 Rev A, NetScreen Technologies, Inc., USA.
NetScreen Command Line Reference Guide, 2000, P/N 093-0000-001 NetScreen Technologies, Inc., USA.
NetScreen Concepts and Examples ScreenOS Reference Guide, 1998-2001, Version 2.5 P/N 093-0039-000 Rev. A, NetScreen Technologies, Inc.
NetScreen Products Webpage, wysiwyg://body_bottom.3/http://www...een.com/products/products.html 1998-1999, NetScreen Technologies, Inc.
NetScreen WebUI, Reference Guide, Version 2.5.0 P/N 093-0040-000 Rev. A, 2000-2001, NetScreen Technologies, Inc.
NetStalker Installation and User's Guide, 1996, Version 1.0.2, Haystack Labs, Inc.
Niculescu, Dragos, "Survey of Active Network Research", Jul. 14, 1999, Rutgers University.
Nortel Northern Telecom, "ISDN Primary Rate User-Network Interface Specification", Aug. 1998.
Nygren, Erik, "The Design and Implementation of a High-Performance Active Network Node", Thesis, Feb. 1998, MIT.
Osbourne, E., "Morningstar Technologies SecureConnect Dynamic Firewall Filter User's Guide", Jun. 14, 1995, V. 1.4, Morning Star Technologies, Inc.
Padovano, Michael, "Networking Applications on UNIX System V Release 4," 1993 Prentice Hall, USA, (2 documents).
Pfeifer, T., "Automatic Conversion of Communication Media", 2000, GMD Research Series, Germany.
Pfeifer, T., "Automatic Conversion of Communication Media", Thesis, 1999, Technischen Universitat Berlin, Berlin.
Pfeifer, T., et al., "Applying Quality-of-Service Parametrization for Medium-to-Medium Conversion", Aug. 25-28, 1996, $8^{th}$ IEEE Workshop on Local and Metropolitan Area Networks, Potsdam, Germany.
Pfeifer, T., "Micronet Machines—New Architectural Approaches for Multimedia End-Systems", 1993 Technical University of Berlin.
Pfeifer, T., "On the Convergence of Distributed Computing and Telecommunications in the Field of Personal Communications", 1995, KiVS, Berlin.
Pfeifer, T., "Speech Synthesis in the Intelligent Personal Communication Support System (IPCSS)", Nov. 2-3, 1995, $2^{nd}$ 'Speak!' Workshop on Speech Generation in Multimodal Information Systems and Practical Applications.

(56) References Cited

OTHER PUBLICATIONS

Pfeifer, T., et al., "Generic Conversion of Communication Media for Supporting Personal Mobility", Nov. 25-27, 1996, Proc. of the Third COST 237 Workshop: Multimedia Telecommunications and Applications.
Pfeifer, T., et al., "Intelligent Handling of Communication Media", Oct. 29-31, 1997, 6th IEEE Workshop on Future Trends of Distributed Computing Systems (FTDCS) Tunis.
Pfeifer, T., et al., "Resource Selection in Heterogeneous Communication Environments using the Teleservice Descriptor", Dec. 15-19, 1997, Proceedings from the 4th COST 237 Workshop: From Multimedia Services to Network Services, Lisboa.
Pfeifer, T., et al., Mobile Guide—Location-Aware Applications from the Lab to the Market, 1998, IDMS '98, LNCS 1483, pp. 15-28.
Pfeifer, T., et al., "The Active Store providing Quality Enhanced Unified Messaging", Oct. 20-22, 1998, 5th Conference on computer Communications, AFRICOM-CCDC '98, Tunis.
Pfeifer, T.,, et al., "*A Modular Location-Aware Service and Application Platform*", 1999, Technical University of Berlin.
Plagemann, T., et al., "*Evaluating Crucial Performance Issues of Protocol Configuration in DaCaPo*", 1994, University of Oslo.
Psounis, Konstantinos, "*Active Networks: Applications, Security, Safety, and Architectures*", First Quarter 1999, IEEE Communications Surveys.
Rabiner, Lawrence, "*Applications of Speech Recognition in the Area of Telecommunications*", 1997, IEEE.
Raman, Suchitra, et al, "*A Model, Analysis, and Protocol Framework for Soft State-based Communications*", Department of EECS, University of California, Berkeley.
Rogaway, Phillip, "*Bucket Hashing and its Application to Fast Message Authentication*", Oct. 13, 1997, Department of Computer Science, University of California.
Schneier, B., et al., "*Remote Auditing of Software Outputs Using a Trusted CoProcessor*", 1997, Elsevier Paper Reprint 1999.
Tennenhouse, D., et al., "*From Internet to ActiveNet*", Laboratory of Computer Science, MIT, 1996.
Tudor, P., "*Tutorial MPEG-2 Video Compression*", Dec. 1995, Electronics & Communication Engineering Journal.
US Copyright Webpage of Copyright Title, "*IPv6: the New Internet Protocol*", by Christian Huitema, 1998 Prentice Hall.
Van der Meer, et al., "*An Approach for a 4th Generation Messaging System*", Mar. 21-23, 1999, The Fourth International Symposium on Autonomous Decentralized Systems ISADS '99, Tokyo.
Van der Meer, Sven, "*Dynamic Configuration Management of the Equipment in Distributed Communication Environments*", Thesis, Oct. 6, 1996, Berlin, (3 documents).
Van Renesse, R. et al., "*Building Adaptive Systems Using Ensemble*", Cornell University Jul. 1997.
Venkatesan, R., et al., "*Threat-Adaptive Security Policy*", 1997, IEEE.
Wetherall, D., et al., "*The Active IP Option*", Sep. 1996, Proceedings of the 7th ACM SIGOPS European Workshop, Connemara, Ireland.
Welch, Terry, "*A Technique for High-Performance Data Compression*", 1984, Sperry Research Center, IEEE.
Zeletin, R. et al., "*Applying Location Aware Computing for Electronic Commerce: Mobile Guide*", Oct. 20-22, 1998, 5th Conference on Computer Communications, AFRICOM-CCDC '98, Tunis.
Zell, Markus, "*Selection of Converter Chains by Means of Quality of Service Analysis*", Thesis, Feb. 12, 1998, Technische Universitat Berlin.
*Implicit Networks, Inc.* v. *Advanced Micro Devices, Inc. et al.*; C08-0184 JLR; USDC for the Western District of Washington, Seattle Division.
Feb. 4, 2008 Plaintiff's Original Complaint.
Aug. 26, 2008 Defendant NVIDIA Corporation's Answer to Complaint.
Aug. 26, 2008 Defendant Sun Microsystems, Inc.'s Answer to Complaint.
Aug. 27, 2008 Defendant Advanced Micro Devices, Inc.'s Answer to Complaint for Patent Infringement.
Aug. 27, 2008 RealNetworks, Inc.'s Answer to Implicit Networks, Inc.'s Original Complaint for Patent Infringement, Affirmative Defenses, and Counterclaims.
Aug. 27, 2008 Intel Corp.'s Answer, Defenses and Counterclaims.
Aug. 27, 2008 Defendant RMI Corporation's Answer to Plaintiff's Original Complaint.
Sep. 15, 2008 Plaintiff's Reply to NVIDIA Corporation's Counterclaims.
Sep. 15, 2008 Plaintiff's Reply to Sun Microsystems Inc.'s Counterclaims.
Sep. 16, 2008 Plaintiff's Reply to RealNetworks, Inc.'s Counterclaims.
Sep. 16, 2008 Plaintiff's Reply to Intel Corp.'s Counterclaims.
Dec. 10, 2008 Order granting Stipulated Motion for Dismissal with Prejudice re NVIDIA Corporation, Inc.
Dec. 16, 2008 Defendants AMD, RealNetworks, RMI, and Sun's Motion to Stay Pending the Patent and Trademark Office's Reexamination of the '163 Patent.
Dec. 29, 2008 Order granting Stipulated Motion for Dismissal without Prejudice of Claims re Sun Microsystems, Inc.
Jan. 5, 2009 Plaintiff's Opposition to Defendants AMD, RealNetworks, RMI, and Sun's Motion to Stay Pending Reexamination and Exhibit A.
Jan. 9, 2009 Reply of Defendants AMD, RealNetworks, RMI, and Sun's Motion to Stay Pending the Patent and Trademark Office's Reexamination of the '163 Patent.
Feb. 9, 2009 Order Granting Stay Pending the United States Patent and Trademark Office's Reexamination of U.S. Pat. No. 6,629,163.
Feb. 17, 2009 Order Granting Stipulated Motion for Dismissal of Advanced Micro Devices, Inc. with Prejudice.
May 14, 2009 Order Granting Stipulated Motion for Dismissal of RMI Corporation with Prejudice.
Oct. 13, 2009 Order Granting Stipulated Motion for Dismissal of Claims Against and Counterclaims by Intel Corporation.
Oct. 30, 2009 Executed Order for Stipulated Motion for Dismissal of Claims Against and Counterclaims by RealNetworks, Inc.
*Implicit Networks, Inc.* v. *Microsoft Corp.*, C09-5628 HLR; USDC for the Northern District of California, San Francisco Division.
Nov. 30, 2009 Plaintiff's Original Complaint, *Implicit* v *Microsoft*, Case No. 09-5628.
Jan. 22, 2010 Order Dismissing Case, *Implicit* v *Microsoft*, Case No. 9-5628.
*Implicit Networks, Inc.* v. *Cisco Systems, Inc.*, C10-3606 HRL; USDC for the Northern District of California, San Francisco Division.
Aug. 16, 2010 Plaintiff's Original Complaint, *Implicit* v *Cisco*, Case No. 10-3606.
Nov. 22, 2010 Defendant Cisco Systems, Inc.'s Answer and Counterclaims, *Implicit* v *Cisco*, Case No. 10-3606.
Dec. 13, 2010 Plaintiff, Implicit Networks, Inc.'s, Answer to Counterclaims, *Implicit* v *Cisco*, Case No. 10-3606.
Oct. 4, 2011 Order of Dismissal with Prejudice, *Implicit* v *Cisco*, Case No. 10-3606.
*Implicit Networks, Inc.* v. *Citrix Systems, Inc.*, C10-3766 JL; USDC for the Northern District of California, San Francisco Division.
Aug. 24, 2010 Plaintiff's Original Complaint, *Implicit* v *Citrix*, Case No. 10-3766.
Dec. 1, 2010 Plaintiff's First Amended Complaint, *Implicit* v *Citrix*, Case No. 10-3766.
Jan. 14, 2011 Defendant Citrix Systems, Inc.'s Answer, Defense and Counter-complaint for Declaratory Judgment, *Implicit* v *Citrix*, Case No. 10-3766.
Feb. 18, 2011 Plaintiff, Implicit Networks, Inc.'s, Answer to Defendants Counterclaims, *Implicit* v *Citrix*, Case No. 10-3766.
May 2, 2011 Order of Dismissal, *Implicit* v *Citrix*, Case No. 10-3766.
*Implicit Networks, Inc.* v.*F5 Networks, Inc.*, C10-3365 JCS; USDC for the Northern District of California, San Francisco Division.
Jul. 30, 2010 Plaintiff's Original Complaint, *Implicit* v *F5*, Case No. 10-3365.

(56) References Cited

OTHER PUBLICATIONS

Oct. 13, 2010 Defendants' Answer and Counter-Complaint, *Implicit v F5*, Case No. 10-3365.
Nov. 3, 2010 Plaintiff's Answer to Counter-Complaint, *Implicit v F5*, Case No. 10-3365.
Dec. 10, 2010 Plaintiff's First Amended Complaint, *Implicit v F5*, Case No. 10-3365.
Jan. 14, 2011 Defendants' Answer to 1$^{st}$ Amended Complaint and Counterclaim, *Implicit v F5*, Case No. 10-3365.
Feb. 18, 2011 Plaintiff's Answer to F5's Amended Counter-Complaint, *Implicit v F5*, Case No. 10-3365.
Apr. 18, 2011 Defendants' Amended Answer to 1$^{st}$ Amended Complaint and Counter-Complaint, *Implicit v F5*, Case No. 10-3365.
May 5, 2011 Plaintiff's Answer to F5's Amended Counter-Complaint, *Implicit v F5*, Case No. 10-3365.
Jul. 22, 2011 F5 Networks, Inc.'s Invalidity Contentions, *Implicit v F5*, Case No. 10-3365.
Jul. 22, 2011 F5 Networks, Inc.'s Invalidity Contentions, Exhibit A, *Implicit v F5*, Case No. 10-3365, (31 documents).
Jul. 22, 2011 F5 Networks, Inc.'s Invalidity Contentions, Exhibit B, *Implicit v F5*, Case No. 10-3365.
Oct. 18, 2011 Joint Claim Construction & Pre-Hearing Statement (PR 4-3), *Implicit v F5*, Case No. 10-3365.
Oct. 18, 2011 Joint Claim Construction & Pre-Hearing Statement (PR 4-3) Exhibit A, *Implicit v F5*, Case No. 10-3365, (2 documents).
Nov. 28, 2011 Plaintiff's Opening Claim Construction Brief, *Implicit v F5*, Case No. 10-3365.
Nov. 29, 2011 Amended Joint Claim Construction & Pre-Hearing Statement, *Implicit v F5*, Case No. 10-3365.
Nov. 29, 2011 Amended Joint Claim Construction & Pre-Hearing Statement, Exhibit A, *Implicit v F5*, Case No. 10-3365.
Dec. 12, 2011 Defendants' Claim Construction Brief, *Implicit v F5*, Case No. 10-3365.
Dec. 19, 2011 Plaintiff's Reply to Defendants' (F5, HP, Juniper) Responsive Claim Construction Brief (4-5), *Implicit v F5*, Case No. 10-3365.
Jan. 27, 2012 Transcript of Proceeding Held on Jan. 17, 2012; *Implicit v F5*, Case No. 10-3365.
Jan. 27, 2012 Transcript of Proceeding Held on Jan. 18, 2012; *Implicit v F5*, Case No. 10-3365.
Jan. 27, 2012 Transcript of Proceeding Held on Jan. 19, 2012; *Implicit v F5*, Case No. 10-3365.
Feb. 29, 2012 Claim Construction Order.
Aug. 15, 2012 Storer Invalidity Report.
Sep. 10, 2012 Implicit's Expert Report of Scott M. Nettles.
Mar. 13, 2013 Order Granting Defendants' Motion for Summary Judgment.
Apr. 9, 2013 Notice of Appeal to the Federal Circuit.
*Implicit Networks, Inc. v. Hewlett-Packard Company*, C10-3746 JCS: USDC for the Northern District of California, San Francisco Division.
Aug. 23, 2010 Plaintiff's Original Complaint, *Implicit v HP*, Case No. 10-3746.
Nov. 23, 2010 Plaintiff's First Amended Complaint, *Implicit v HP*, Case No. 10-3746.
Nov. 14, 2011 Defendant HP's Answer and Counterclaims, *Implicit v HP*, Case No. 10-3746.
Feb. 18, 2011 Implicit Networks, Inc.'s Answer to HP Counterclaims, *Implicit v HP*, Case No. 10-3746.
May 10, 2011 Plaintiff's Amended Disclosure of Asserted Claims and Infringement Contentions, Case No. 10-3746.
Jun. 30, 2011 Defendant HP Company's Invalidity Contentions, *Implicit v HP*, Case No. 10-3746.
Jun. 30, 2011 Defendant HP Company's Invalidity Contentions, A1-14, *Implicit v HP*, Case No. 10-3746.
Jun. 30, 2011 Defendant HP Company's Invalidity Contentions, B1-21, *Implicit v HP*, Case No. 10-3746.
*Implicit Networks, Inc. v. Juniper Networks*, C10-4234 EDL: USDC for the Northern District of California, San Francisco Division.
Sep. 20, 2010 Plaintiff's Original Complaint, *Implicit v Juniper*, Case No. 10-4234.
Nov. 12, 2010 Juniper Network's Motion to Dismiss for Failure to State a Claim Under Rule 12(B)(6): Memorandum of Points and Authorities; *Implicit v Juniper*, Case No. 10-4234.
Nov. 12, 2010 Juniper Network's Request for Judicial Notice in Support of its Motion to Dismiss for Failure to State a Claim Under Rule 12(B)(6): Memorandum of Points and Authorities; *Implicit v Juniper*, Case No. 10-4234.
Dec. 1, 2010 First Amended Complaint; *Implicit v Juniper*, Case No. 10-4234.
Jan. 18, 2011 Juniper Networks, Inc.'s Answer and Affirmative Defenses to 1$^{st}$ Amended Complaint, *Implicit v Juniper*, Case No. 10-4234.
Dec. 18, 2011 Plaintiff's Answer to Defendant's Counterclaims, *Implicit v Juniper*, Case No. 10-4234.
May 23, 2011 Plaintiff's Disclosure of Asserted Claims and Infringement Contentions, *Implicit v Juniper*, Case No. 10-4234.
Nov. 15, 2011 Plaintiff's Amended Disclosure of Asserted Claim and Infringement Contentions, *Implicit v Juniper*, Case No. 10-4234.
Nov. 28, 2011 Spencer Hosie Declaration in Support of Plaintiff's Opening Claim Construction Brief), *Implicit v Juniper*, Case No. 10-4234.
Nov. 28, 2011 Spencer Hosie Declaration in Support of Plaintiff's Opening Claim Construction Brief Exhibit E, *Implicit v Juniper*, Case No. 10-4234.
Nov. 28, 2011 Spencer Hosie Declaration in Support of Plaintiff's Opening Claim Construction Brief Exhibit J, *Implicit v Juniper*, Case No. 10-4234.
Nov. 28, 2011 Spencer Hosie Declaration in Support of Plaintiff's Opening Claim Construction Brief Exhibit K, *Implicit v Juniper*, Case No. 10-4234.
Nov. 28, 2011 Spencer Hosie Declaration in Support of Plaintiff's Opening Claim Construction Brief Exhibits M-O, *Implicit v Juniper*, Case No. 10-4234.
Dec. 12, 2011 Holly Hogan Declaration in Support of Defendants' Claim Construction Brief, *Implicit v Juniper*, Case No. 10-4234.
Dec. 12, 2011 Holly Hogan Declaration in Support of Defendants' Claim Construction Brief, Exhibit B, *Implicit v Juniper*, Case No. 10-4234.
Dec. 12, 2011 Holly Hogan Declaration in Support of Defendants' Claim Construction Brief, Exhibit F, *Implicit v Juniper*, Case No. 10-4234.
Dec. 12, 2011 Holly Hogan Declaration in Support of Defendants' Claim Construction Brief, Exhibit N, *Implicit v Juniper*, Case No. 10-4234.
Dec. 12, 2011 Holly Hogan Declaration in Support of Defendants' Claim Construction Brief, Exhibit P, *Implicit v Juniper*, Case No. 10-4234.
Dec. 12, 2011 Holly Hogan Declaration in Support of Defendants' Claim Construction Brief, Exhibit Q, *Implicit v Juniper*, Case No. 10-4234.
Dec. 12, 2011 Holly Hogan Declaration in Support of Defendants' Claim Construction Brief, Exhibit S., *Implicit v Juniper*, Case No. 10-4234.
Dec. 12, 2011 Holly Hogan Declaration in Support of Defendants' Claim Construction Brief, Exhibit T-1, *Implicit v Juniper*, Case No. 10-4234.
Dec. 12, 2011 Holly Hogan Declaration in Support of Defendants' Claim Construction Brief, Exhibit T-2, *Implicit v Juniper*, Case No. 10-4234.
Dec. 12, 2011 Holly Hogan Declaration in Support of Defendants' Claim Construction Brief, Exhibit T-3, *Implicit v Juniper*, Case No. 10-4234.
Dec. 12, 2011 Holly Hogan Declaration in Support of Defendants' Claim Construction Brief, Exhibit T-4, *Implicit v Juniper*, Case No. 10-4234.
Dec. 12, 2011 Holly Hogan Declaration in Support of Defendants' Claim Construction Brief, Exhibit U, *Implicit v Juniper*, Case No. 10-4234.

(56) References Cited

OTHER PUBLICATIONS

Dec. 12, 2011 Holly Hogan Declaration in Support of Defendants' Claim Construction Brief, Exhibit V, *Implicit* v *Juniper*, Case No. 10-4234.
Dec. 12, 2011 Holly Hogan Declaration in Support of Defendants' Claim Construction Brief, Exhibit W, *Implicit* v *Juniper*, Case No. 10-4234.
Dec. 12, 2011 Holly Hogan Declaration in Support of Defendants' Claim Construction Brief, Exhibit X, *Implicit* v *Juniper*, Case No. 10-4234.
Dec. 12, 2011 Holly Hogan Declaration in Support of Defendants' Claim Construction Brief, Exhibit Y-1, *Implicit* v *Juniper*, Case No. 10-4234.
Dec. 12, 2011 Holly Hogan Declaration in Support of Defendants' Claim Construction Brief, Exhibit Y-2, *Implicit* v *Juniper*, Case No. 10-4234.
Dec. 12, 2011 Holly Hogan Declaration in Support of Defendants' Claim Construction Brief, Exhibit Y-3, *Implicit* v *Juniper*, Case No. 10-4234.
Dec. 12, 2011 Holly Hogan Declaration in Support of Defendants' Claim Construction Brief, Exhibit Y-4, *Implicit* v *Juniper*, Case No. 10-4234.
Dec. 12, 2011 Holly Hogan Declaration in Support of Defendants' Claim Construction Brief, Exhibit Z, *Implicit* v *Juniper*, Case No. 10-4234.
Dec. 12, 2011 Spencer Hosie Declaration in Support of Plaintiff's Reply Claim Construction Brief, *Implicit* v *Juniper*, Case No. 10-4234.
Dec. 12, 2011 Spencer Hosie Declaration in Support of Plaintiff's Reply Claim Construction Brief, Exhibit P, *Implicit* v *Juniper*, Case No. 10-4234.
Jan. 10, 2012 Plaintiff's Jan. 10, 2012 Amended Disclosure of Asserted Claims and Infringement Contentions, *Implicit* v *Juniper*, Case No. 10-4234.
Feb. 10, 2012 Juniper Networks, Inc.'s Supplemental Invalidity Contentions, *Implicit* v *Juniper*, Case No. 10-4234.
Feb. 10, 2012 Juniper Networks, Inc.'s Supplemental Invalidity Contentions, Exhibit A1, *Implicit* v *Juniper*, Case No. 10-4234.
Feb. 10, 2012 Juniper Networks, Inc.'s Supplemental Invalidity Contentions, Exhibit A2, *Implicit* v *Juniper*, Case No. 10-4234.
Feb. 10, 2012 Juniper Networks, Inc.'s Supplemental Invalidity Contentions, Exhibit A3, *Implicit* v *Juniper*, Case No. 10-4234.
Feb. 10, 2012 Juniper Networks, Inc.'s Supplemental Invalidity Contentions, Exhibit A4, *Implicit* v *Juniper*, Case No. 10-4234.
Feb. 10, 2012 Juniper Networks, Inc.'s Supplemental Invalidity Contentions, Exhibit B1, *Implicit* v *Juniper*, Case No. 10-4234.
Feb. 29, 2012 Plaintiff's Feb. 29, 2012 Amended Disclosure of Asserted Claims and Infringement Contentions, *Implicit* v *Juniper*, Case No. 10-4234.
Apr. 6, 2012 Plaintiff's Apr. 6, 2012 Amended Disclosure of Asserted Claims and Infringement Contentions, *Implicit* v *Juniper*, Case No. 10-4234.
Apr. 9, 2012 Plaintiff's Apr. 9, 2012 Amended Disclosure of Asserted Claims and Infringement Contentions, *Implicit* v *Juniper*, Case No. 10-4234.
Sep. 11, 2012 Implicit's Expert Report of Scott Nettles.
Nov. 9, 2012 Juniper's Notice of Motion and Memorandum of Law ISO Motion for Summary Judgment or, in the alternative, for Partial Summary Judgment, on the Issue of Invalidity.
Nov. 9, 2012 Exhibit 2 to Declaration in support of Juniper's Motion for Summary Judgment—Calvert Expert Report.
Nov. 9, 2012 Exhibit 3 to Declaration in support of Juniper's Motion for Summary Judgment—Calvert Supplemental Expert Report.
Nov. 26, 2012 Implicit Opposition to Juniper's and F5 Motion on Invalidity.
Nov. 26, 2012 Exhibit A to Hosie Declaration—Aug. 27, 2012 Excerpts from David Blaine deposition.
Nov. 26, 2012 Exhibit B to Hosie Declaration—Oct. 25, 2012 Excerpts from Kenneth Calvert Deposition.
Nov. 26, 2012 Exhibit C to Hosie Declaration—Aug. 15, 2012 Excerpts from Kenneth Calvert Expert Report.
Nov. 26, 2012 Exhibit D to Hosie Declaration—U.S. Pat. No. 6,651,099 to Dietz et al.
Nov. 26, 2012 Exhibit E to Hosie Declaration—Understanding Packet-Based and Flow-Based Forwarding.
Nov. 26, 2012 Exhibit F to Hosie Declaration—Wikipedia on Soft State.
Nov. 26, 2012 Exhibit G to Hosie Declaration—Sprint Notes.
Nov. 26, 2012 Exhibit H to Hosie Declaration—Implicit's Supplemental Response to Juniper's $2^{nd}$ Set of Interrogatories.
Nov. 26, 2012 Exhibit I to Hosie Declaration—U.S. Pat. No. 7,650,634 (Zuk).
Other Implicit Networks, Inc. Prosecution Matters.
U.S. Appl. No. 11/933,022 Utility Application filed Oct. 31, 2007.
U.S. Appl. No. 11/933,022 Preliminary Amendment filed Feb. 19, 2008.
U.S. Appl. No. 11/933,022 Office Action dated Jun. 24, 2009.
U.S. Appl. No. 11/933,022 Amendment filed Sep. 24, 2009.
U.S. Appl. No. 11/933,022 Office Action dated Dec. 11, 2009.
U.S. Appl. No. 11/933,022 Amendment and Response dated Jan. 29, 2010.
U.S. Appl. No. 11/933,022 Notice of Allowance dated Mar. 2, 2010.
U.S. Appl. No. 11/933,022 Issue Notification dated May 4, 2010.
U.S. Appl. No. 10/636,314 Utility Application filed Aug. 6, 2003.
U.S. Appl. No. 10/636,314 Office Action dated Apr. 7, 2008.
U.S. Appl. No. 10/636,314 Response to Restriction Requirement dated Aug. 5, 2008.
U.S. Appl. No. 10/636,314 Office Action dated Oct. 3, 2008.
U.S. Appl. No. 10/636,314 Response to Office Action dated Apr. 3, 2009.
U.S. Appl. No. 10/636,314 Notice of Non-Compliant Amendment dated May 4, 2009.
U.S. Appl. No. 10/636,314 Amendment to Office Action Response dated Jun. 4, 2009.
U.S. Appl. No. 10/636,314 Notice of Non-Compliant Amendment dated Jun. 12, 2009.
U.S. Appl. No. 10/636,314 Amendment to Office Action dated Jul. 10, 2009.
U.S. Appl. No. 10/636,314 Final Rejection Office Action dated Oct. 21, 2009.
U.S. Appl. No. 10/636,314 Amendment after Final Office Action dated Dec. 14, 2009.
U.S. Appl. No. 10/636,314 Advisory Action dated Jan. 11, 2010.
U.S. Appl. No. 10/636,314 Notice of Non-Compliant Amendment dated Jan. 11, 2010.
U.S. Appl. No. 10/636,314 Supplemental Amendment and Response dated Mar. 13, 2010.
U.S. Appl. No. 10/636,314 Office Action dated May 11, 2010.
U.S. Appl. No. 10/636,314 Amendment and Response dated Sep. 13, 2010.
U.S. Appl. No. 10/636,314 Final Rejection dated Nov. 24, 2010.
U.S. Appl. No. 10/636,314 Notice of Appeal dated May 19, 2011.
U.S. Appl. No. 10/636,314 Amendment and Request for Continued Examination dated Jul. 19, 2011.
U.S. Appl. No. 10/636,314 Notice of Allowance dated Sep. 13, 2011.
U.S. Appl. No. 10/636,314 Notice of Allowance dated Sep. 19, 2011.
U.S. Appl. No. 10/636,314 Issue Notification dated Oct. 19, 2011.
U.S. Appl. No. 09/474,664 Utility Application filed Dec. 29, 1999.
U.S. Appl. No. 09/474,664 Office Action dated Sep. 23, 2002.
U.S. Appl. No. 09/474,664 Amendment and Response dated Feb. 24, 2003.
U.S. Appl. No. 09/474,664 Notice of Allowance dated May 20, 2003.
U.S. Appl. No. 90/010,356 Request for Ex Parte Reexamination dated Dec. 15, 2008.
U.S. Appl. No. 90/010,356 Office Action Granting Reexamination dated Jan. 17, 2009.
U.S. Appl. No. 90/010,356 First Office Action dated Jul. 7, 2009.
U.S. Appl. No. 90/010,356 First Office Action Response dated Sep. 1, 2009.

(56) References Cited

OTHER PUBLICATIONS

U.S. Appl. No. 90/010,356 Patent Owner Interview Summary dated Oct. 23, 2009.
U.S. Appl. No. 90/010,356 Office Action Final dated Dec. 4, 2009.
U.S. Appl. No. 90/010,356 Amendment and Response to Office Action dated Dec. 18, 2009.
U.S. Appl. No. 90/010,356 Amendment and Response to Office Action dated Jan. 4, 2010.
U.S. Appl. No. 90/010,356 Advisory Action dated Jan. 21, 2010.
U.S. Appl. No. 90/010,356 Amendment and Response to Advisory Action dated Feb. 8, 2010.
U.S. Appl. No. 90/010,356 Notice of Intent to Issue a Reexam Certificate dated Mar. 2, 2010.
U.S. Appl. No. 90/010,356 Reexamination Certificate Issued dated Jun. 22, 2010.
U.S. Appl. No. 95/000,659 Inter Partes Reexam Request dated Feb. 13, 2012.
U.S. Appl. No. 95/000,659 Order Granting Reexamination dated Apr. 3, 2012.
U.S. Appl. No. 95/000,659 Office Action dated Apr. 3, 2012.
U.S. Appl. No. 95/000,659 Office Action Response dated Jun. 4, 2012 (including Exhibits 1 & 2), (4 documents).
U.S. Appl. No. 95/000,659 Third Party Comments to Patent Owner's Response to Office Action dated Jul. 5, 2012.
U.S. Appl. No. 95/000,659 Appendix R-1 to Third Party Comments to Patent Owner's Response to Office Action dated Jul. 5, 2012 (Declaration of Prof. Dr. Bernhard Plattner).
U.S. Appl. No. 95/000,659 Appendix R-2 to Third Party Comments to Patent Owner's Response to Office Action dated Jul. 5, 2012 (Prof. Dr. Bernhard Plattner CV).
U.S. Appl. No. 95/000,659 Appendix R-3 to Third Party Comments to Patent Owner's Response to Office Action dated Jul. 5, 2012 (Listing of Publications to Prof. Dr. Bernhard Plattner updated Feb. 2012).
U.S. Appl. No. 95/000,659 Appendix R-4 to Third Party Comments to Patent Owner's Response to Office Action dated Jul. 5, 2012(Office Action Granting Reexamination in 95/000,660 dated May 10, 2012).
U.S. Appl. No. 95/000,659 Appendix R-5 to Third Party Comments to Patent Owner's Response to Office Action dated Jul. 5, 2012 (Office Action in 95/000,660 dated May 10, 2012).
U.S. Appl. No. 95/000,659 Appendix R-6 to Third Party Comments to Patent Owner's Response to Office Action dated Jul. 5, 2012 (Implicit Networks, Inc. U.S. Pat. No. 6,629,163 Claims Chart).
U.S. Appl. No. 95/000,659 Appendix R-7 to Third Party Comments to Patent Owner's Response to Office Action dated Jul. 5, 2012 (Internet Protocol DARPA Internet Program Protocol Specification dated Sep. 1991).
U.S. Appl. No. 95/000,659 Appendix R-8 to Third Party Comments to Patent Owner's Response to Office Action dated Jul. 5, 2012 (Atkinson, IP Encapsulating Security Payload (ESP) dated Aug. 1995).
U.S. Appl. No. 95/000,659 Appendix R-9 to Third Party Comments to Patent Owner's Response to Office Action dated Jul. 5, 2012 (Claim Construction Order dated Feb. 29, 2012).
U.S. Appl. No. 95/000,659 Appendix R-10-1 to Third Party Comments to Patent Owner's Response to Office Action dated Jul. 5, 2012 (vol. I of Edward Balassanian Deposition Transcript dated May 30, 2012).
U.S. Appl. No. 95/000,659 Appendix R-10-2 to Third Party Comments to Patent Owner's Response to Office Action dated Jul. 5, 2012 (vol. II of Edward Balassanian Deposition Transcript dated May 31, 2012).
U.S. Appl. No. 95/000,659 Appendix R-10-3 to Third Party Comments to Patent Owner's Response to Office Action dated Jul. 5, 2012 (vol. III of Edward Balassanian Deposition Transcript dated Jun. 7, 2012).
U.S. Appl. No. 95/000,659 Appendix R-10-4 to Third Party Comments to Patent Owner's Response to Office Action dated Jul. 5, 2012 (vol. IV of Edward Balassanian Deposition Transcript dated Jun. 8, 2012).
U.S. Appl. No. 95/000,659 Appendix R-11 to Third Party Comments to Patent Owner's Response to Office Action dated Jul. 5, 2012 (Implicit Networks, Inc.'s Response to Juniper Networks, Inc.'s First Set of Requests for Admission 1-32).
U.S. Appl. No. 95/000,659 Action Closing Prosecution dated Oct. 1, 2012.
U.S. Appl. No. 95/000,659 Petition to Withdraw and Reissue Action Closing Prosecution dated Nov. 20, 2012.
U.S. Appl. No. 95/000,659 Patent Owner Comments to Action Closing Prosecution dated Dec. 3, 2012.
U.S. Appl. No. 95/000,659 Opposition to Petition dated Dec. 17, 2012.
U.S. Appl. No. 95/000,659 Third Party Comments to Action Closing Prosecution dated Jan. 2, 2013.
U.S. Appl. No. 95/000,660 Inter Partes Reexam Request dated Mar. 2, 2012.
U.S. Appl. No. 95/000,660 Order Granting Reexamination dated May 10, 2012.
U.S. Appl. No. 95/000,660 Office Action dated May 10, 2012.
U.S. Appl. No. 95/000,660 Response to Office Action dated Jul. 10, 2012 (including Exhibits 1 and 2).
U.S. Appl. No. 95/000,660 Third Party Comments to Office After Patent Owner's Response dated Aug. 8, 2012 (including Revised Comments).
U.S. Appl. No. 95/000,660 to Third Party Comments to Patent Owner's Response to Office Action dated Aug. 8, 2012 (Declaration of Prof. Dr. Bernhard Plattner).
U.S. Appl. No. 95/000,660 Appendix R-1 to Third Party Comments to Patent Owner's Response to Office Action dated Aug. 8, 2012 (Prof. Dr. Bernhard Plattner CV).
U.S. Appl. No. 95/000,660 Appendix R-3 to Third Party Comments to Patent Owner's Response to Office Action dated Aug. 8, 2012 (Listing of Publications to Prof. Dr. Bernhard Plattner updated Feb. 2012).
U.S. Appl. No. 95/000,660 Appendix R-4 to Third Party Comments to Patent Owner's Response to Office Action dated Aug. 8, 2012(Office Action Granting Reexamination in 95/000,660 dated May 10, 2012).
U.S. Appl. No. 95/000,660 Appendix R-5 to Third Party Comments to Patent Owner's Response to Office Action dated Aug. 8, 2012 (Office Action in 95/000,660 dated May 10, 2012).
U.S. Appl. No. 95/000,660 Appendix R-6 to Third Party Comments to Patent Owner's Response to Office Action dated Aug. 8, 2012 (Implicit Networks, Inc. U.S. Pat. No. 6,629,163 Claims Chart).
U.S. Appl. No. 95/000,660 Appendix R-7 to Third Party Comments to Patent Owner's Response to Office Action dated Aug. 8, 2012 (Internet Protocol DARPA Internet Program Protocol Specification dated Sep. 1991).
U.S. Appl. No. 95/000,660 Appendix R-8 to Third Party Comments to Patent Owner's Response to Office Action dated Aug. 8, 2012 (Atkinson, IP Encapsulating Security Payload (ESP) dated Aug. 1995).
U.S. Appl. No. 95/000,660 Appendix R-9 to Third Party Comments to Patent Owner's Response to Office Action dated Aug. 8, 2012 (Claim Construction Order dated Feb. 29, 2012).
U.S. Appl. No. 95/000,660 Appendix R-10 to Third Party Comments to Patent Owner's Response to Office Action dated Aug. 8, 2012 (vol. I-IV of Edward Balassanian Deposition Transcript dated May 30, 2012).
U.S. Appl. No. 95/000,660 Appendix R-11 to Third Party Comments to Patent Owner's Response to Office Action dated Aug. 8, 2012 (Shacham, A., et al, "*IP Payload Compression Protocol*", Network Working Group, RFC 3173 Sep. 2001).
U.S. Appl. No. 95/000,660 Appendix R-12 to Third Party Comments to Patent Owner's Response to Office Action dated Aug. 8, 2012 (Shacham, A., et al, "*IP Payload Compression Protocol*", Network Working Group, RFC 2393 Dec. 1998).

(56) References Cited

OTHER PUBLICATIONS

U.S. Appl. No. 95/000,660 Appendix R-13 to Third Party Comments to Patent Owner's Response to Office Action dated Aug. 8, 2012 ('163 Pfeiffer Claim Chart).
U.S. Appl. No. 95/000,660 Appendix R-14 to Third Party Comments to Patent Owner's Response to Office Action dated Aug. 8, 2012 (Ylonen, T., "*SSH Transport Layer Protocol*", Network Working Group—Draft Feb. 22, 1999).
U.S. Appl. No. 95/000,660 Appendix R-15 to Third Party Comments to Patent Owner's Response to Office Action dated Aug. 8, 2012 (Dommety, G., "*Key and Sequence Number Extensions to GRE*", Network Working Group, RFC 2890 Sep. 2000).
U.S. Appl. No. 95/000,660 Appendix R-16 to Third Party Comments to Patent Owner's Response to Office Action dated Aug. 8, 2012 (Monsour, R., et al, "*Compression in IP Security*" Mar. 1997).
U.S. Appl. No. 95/000,660 Appendix R-17 to Third Party Comments to Patent Owner's Response to Office Action dated Aug. 8, 2012 (Friend, R., Internet Working Group RFC 3943 dated Nov. 2004 *Transport Layer Security Protocol Compression Using Lempel-Ziv-Stac*).
U.S. Appl. No. 95/000,660 Appendix R-18 to Third Party Comments to Patent Owner's Response to Office Action dated Aug. 8, 2012(Implicit Networks, Inc.'s Response to Juniper Networks, Inc.'s First Set of Requests for Admission 1-32).
U.S. Appl. No. 95/000,660 Revised—Third Party Comments to Office After Patent Owner's Response dated Nov. 2, 2012.
U.S. Appl. No. 95/000,660 Action Closing Prosecution dated Dec. 21, 2012.
U.S. Appl. No. 95/000,660 Comments to Action Closing Prosecution dated Feb. 21, 2013 (including Dec of Dr. Ng).
U.S. Appl. No. 95/000,660 Third Party Comments to Action Closing Prosecution dated Mar. 25, 2013.
PCT/US00/33634—PCT application (WO 01/2077 A2—Jul. 12, 2001).
PCT/US00/33634—Written Opinion (WO 01/50277 A3—Feb. 14, 2002).
PCT/US00/33634—International Search Report (dated Oct. 9, 2001).
PCT/US00/33634—Response to Official Communication dated Dec. 7, 2001 (dated Mar. 21, 2002).
PCT/US00/33634—International Preliminary Examination Report (dated Apr. 8, 2002).
PCT/US00/33634—Official Communication (dated Jan. 24, 2003).
PCT/US00/33634—Response to Official Communication dated Jan. 24, 2003 (dated Mar. 12, 2003).
PCT/US00/33634—Official Communication (dated May 13, 2004).
PCT/US00/33634—Response to Summons to Attend Oral Proceeding dated May 13, 2004 (dated Oct. 9, 2004).
PCT/US00/33634—Decision to Refuse a European Patent application (dated Nov. 12, 2004).
PCT/US00/33634—Minutes of the oral proceedings before the Examining Division (dated Oct. 12, 2004).
PCT/US00/33634—Closure of the procedure in respect to Application No. 00984234.5-2212 (dated Feb. 22, 2005).
May 3, 2013 Expert Report of Dr. Alfonso Cardenas Regarding Validity of U.S. Pat. Nos. 6,877,006; 7,167,864; 7,720,861; and 8,082,268, (6 documents).
Expert Report of Dr. Alfonso Cardenas Regarding Validity of U.S. Pat. No. 7,167,864, (3 documents).
"InfoReports User Guide: Version 3.3.1;" Platinum Technology, Publication No. PRO-X-331-UG00-00, printed Apr. 1998; pp. 1-430.

\* cited by examiner

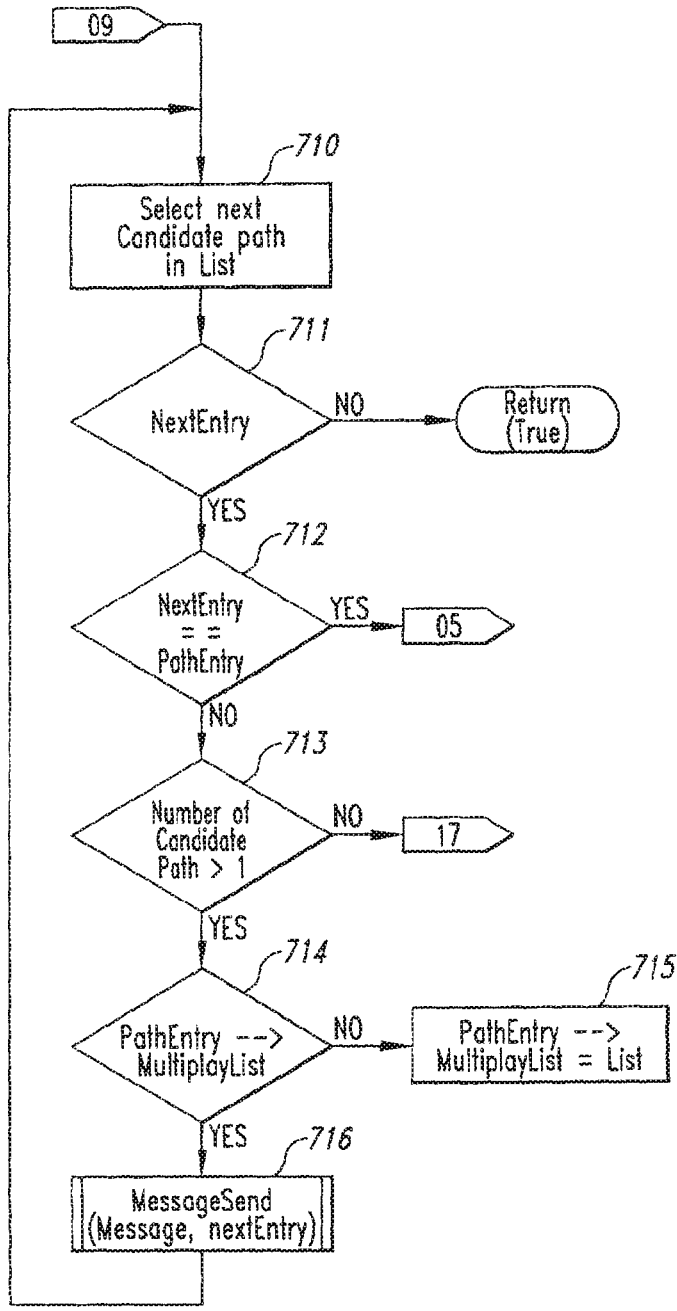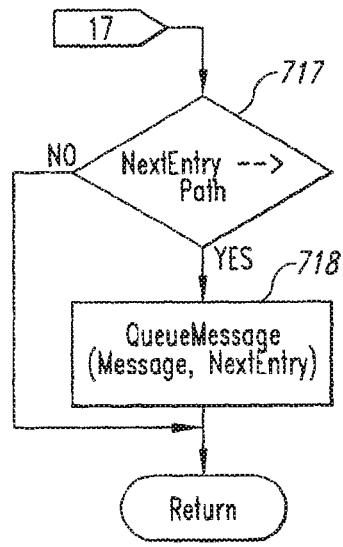
Fig. 7B
Fig. 7C

METHOD AND SYSTEM FOR DATA DEMULTIPLEXING

CROSS REFERENCES TO RELATED APPLICATIONS

The present application is a continuation of U.S. application Ser. No. 15/450,790, filed Mar. 6, 2017, which is a continuation of U.S. application Ser. No. 15/050,027, filed Feb. 22, 2016 (now U.S. Pat. No. 9,591,104), which is a continuation of U.S. application Ser. No. 14/230,952, filed Mar. 31, 2014 (now U.S. Pat. No. 9,270,790), which is a continuation of U.S. application Ser. No. 13/911,324, filed Jun. 6, 2013 (now U.S. Pat. No. 8,694,683), which is a continuation of U.S. application Ser. No. 13/236,090, filed Sep. 19, 2011 (now abandoned), which is a continuation of U.S. application Ser. No. 10/636,314, filed Aug. 6, 2003 (now U.S. Pat. No. 8,055,786), which is a continuation of U.S. application Ser. No. 09/474,664, filed Dec. 29, 1999 (now U.S. Pat. No. 6,629,163); the disclosures of each of the above-referenced applications are incorporated by reference herein in their entireties.

TECHNICAL FIELD

The present invention relates generally to a computer system for data demultiplexing.

BACKGROUND

Computer systems, which are becoming increasingly pervasive, generate data in a wide variety of formats. The Internet is an example of interconnected computer systems that generate data in many different formats. Indeed, when data is generated on one computer system and is transmitted to another computer system to be displayed, the data may be converted in many different intermediate formats before it is eventually displayed. For example, the generating computer system may initially store the data in a bitmap format. To send the data to another computer system, the computer system may first compress the bitmap data and then encrypt the compressed data. The computer system may then convert that compressed data into a TCP format and then into an IP format. The IP formatted data may be converted into a transmission format, such as an ethernet format. The data in the transmission format is then sent to a receiving computer system. The receiving computer system would need to perform each of these conversions in reverse order to convert the data in the bitmap format. In addition, the receiving computer system may need to convert the bitmap data into a format that is appropriate for rendering on output device.

In order to process data in such a wide variety of formats, both sending and receiving computer systems need to have many conversion routines available to support the various formats. These computer systems typically use predefined configuration information to load the correct combination of conversion routines for processing data. These computer systems also use a process-oriented approach when processing data with these conversion routines. When using a process-oriented approach, a computer system may create a separate process for each conversion that needs to take place. A computer system in certain situations, however, can be expected to receive data and to provide data in many different formats that may not be known until the data is received. The overhead of statically providing each possible series of conversion routines is very high. For example, a computer system that serves as a central controller for data received within a home would be expected to process data received via telephone lines, cable TV lines, and satellite connections in many different formats. The central controller would be expected to output the data to computer displays, television displays, entertainment centers, speakers, recording devices, and so on in many different formats. Moreover, since the various conversion routines may be developed by different organizations, it may not be easy to identify that the output format of one conversion routine is compatible with the input format of another conversion routine.

It would be desirable to have a technique for dynamically identifying a series of conversion routines for processing data. In addition, it would be desirable to have a technique in which the output format of one conversion routine can be identified as being compatible with the input format of another conversion routine. It would also be desirable to store the identification of a series of conversion routines so that the series can be quickly identified when data is received.

DETAILED DESCRIPTION

Figure 1:
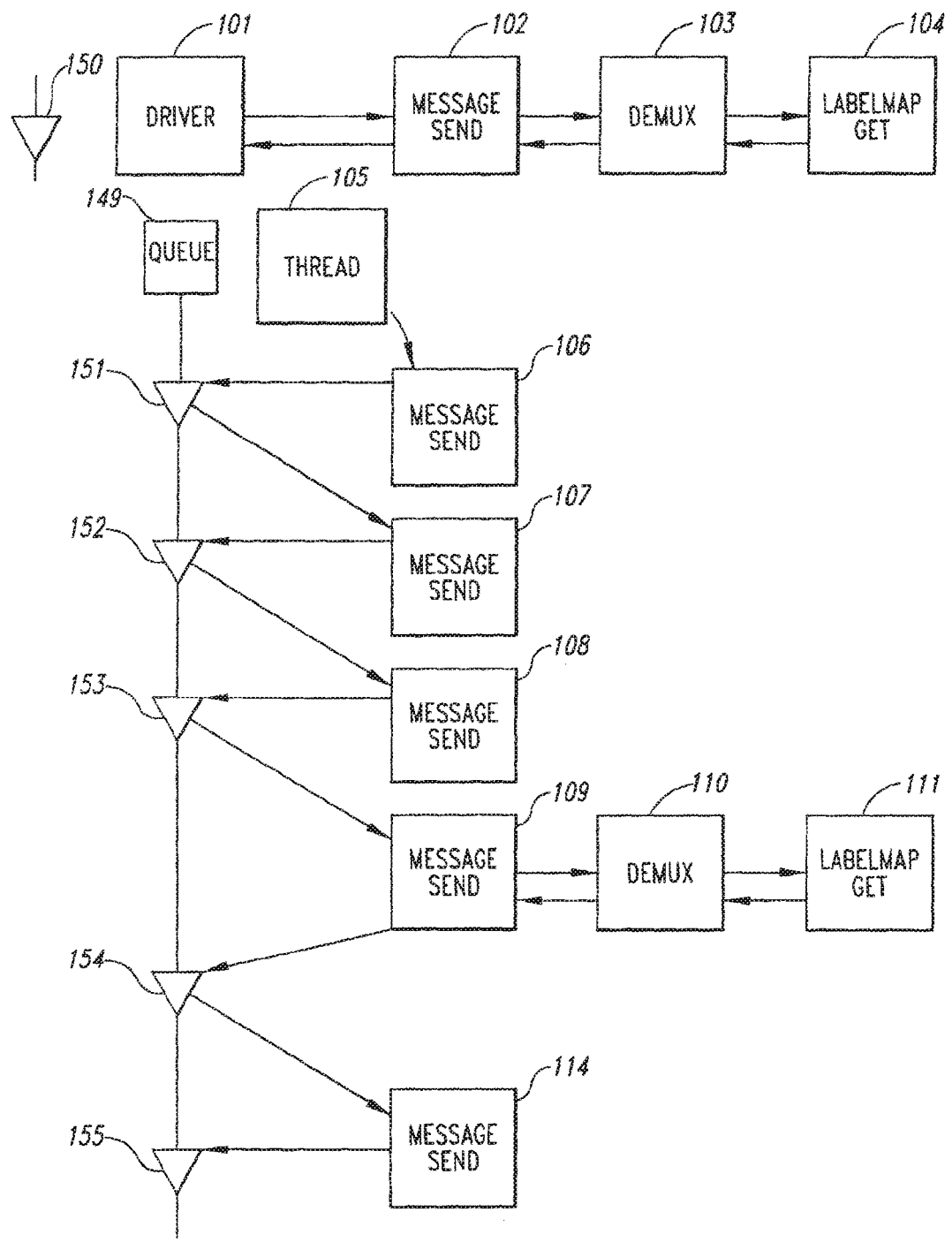
FIG. 1 is a block diagram illustrating example processing of a message by the conversion system.

A method and system for converting a message that may contain multiple packets from an source format into a target format. When a packet of a message is received, the conversion system in one embodiment searches for and identifies a sequence of conversion routines (or more generally message handlers) for processing the packets of the message by comparing the input and output formats of the conversion routines. (A message is a collection of data that is related in some way, such as stream of video or audio data or an email message.) The identified sequence of conversion routines is used to convert the message from the source format to the target format using various intermediate formats. The conversion system then queues the packet for processing by the identified sequence of conversion routines. The conversion system stores the identified sequence so that the sequence can be quickly found (without searching) when the next packet in the message is received. When subsequent packets of the message are received, the conversion system identifies the sequence and queues the packets for pressing by the sequence. Because the conversion system receives multiple messages with different source and target formats and identifies a sequence of conversion routines for each message, the conversion systems effectively "demultiplexes" the messages. That is, the conversion system demultiplexes the messages by receiving the message, identifying the sequence of conversion routines, and controlling the processing of each message by the identified sequence. Moreover, since the conversion routines may need to retain state information between the receipt of one packet of a message and the next packet of that message, the conversion system maintains state information as an instance or session of the conversion routine. The conversion system routes all packets for a message through the same session of each conversion routine so that the same state or instance information can be used by all packets of the message. A sequence of sessions of conversion routines is referred to as a "path." In one embodiment, each path has a path thread associated with it for processing of each packet destined for that path.

In one embodiment, the packets of the messages are initially received by "drivers," such as an Ethernet driver. When a driver receives a packet, it forwards the packet to a forwarding component of the conversion system. The forwarding component is responsible for identifying the session of the conversion routine that should next process the packet and invoking that conversion routine. When invoked by a driver, the forwarding component may use a demultiplexing ("demux") component to identify the session of the first conversion routine of the path that is to process the packet and then queues the packet for processing by the path. A path thread is associated with each path. Each path thread is responsible for retrieving packets from the queue of its path and forwarding the packets to the forwarding component. When the forwarding component is invoked by a path thread, it initially invokes the first conversion routine in the path. That conversion routine processes the packet and forwards the processed packet to the forwarding component, which then invokes the second conversion routine in the path. The process of invoking the conversion routines and forwarding the processed packet to the next conversion routine continues until the last conversion routine in the path is invoked. A conversion routine may defer invocation of the forwarding component until it aggregates multiple packets or may invoke the forwarding component multiple times for a packet once for each sub-packet.

The forwarding component identifies the next conversion routine in the path using the demux component and stores that identification so that the forwarding component can quickly identify the conversion routine when subsequent packets of the same message are received. The demux component, searches for the conversion routine and session that is to next process a packet. The demux component then stores the identification of the session and conversion routine as part of a path data structure so that the conversion system does not need to search for the session and conversion routine when requested to demultiplex subsequent packets of the same message. When searching for the next conversion routine, the demux component invokes a label map get component that identifies the next conversion routine. Once the conversion routine is found, the demux component identifies the session associated with that message by, in one embodiment, invoking code associated with the conversion routine. In general, the code of the conversion routine determines what session should be associated with a message. In certain situations, multiple messages may share the same session. The demux component then extends the path for processing that packet to include that session and conversion routine. The sessions are identified so that each packet is associated with the appropriate state information. The dynamic identification of conversion routines is described in U.S. patent application Ser. No. 11/933,093, filed on Oct. 31, 2007 (now U.S. Pat. No. 7,730,211), entitled "Method and System for Generating a Mapping Between Types of Data," which is hereby incorporated by reference.

FIG. 1 is a block diagram illustrating example processing of a message by the conversion system. The driver 101 receives the packets of the message from a network. The driver performs any appropriate processing of the packet and invokes a message send routine passing the processed packet along with a reference path entry 150. The message send routine is an embodiment of the forwarding component. A path is represented by a series of path entries, which are represented by triangles. Each member path entry represents a session and conversion routine of the path, and a reference path entry represents the overall path. The passed reference path entry 150 indicates to the message send routine that it is being invoked by a driver. The message send routine invokes the demux routine 102 to search for and identify the path of sessions that is to process the packet. The demux routine may in turn invoke the label map get routine 104 to identify a sequence of conversion routines for processing the packet. In this example, the label map get routine identifies the first three conversion routines, and the demux routine creates the member path entries 151, 152, 153 of the path for these conversion routines. Each path entry identifies a session for a conversion routine, and the sequence of path entries 151-155 identifies a path. The message send routine then queues the packet on the queue 149 for the path that is to process the packets of the message. The path thread 105 for the path retrieves the packet from the queue and invokes the message send routine 106 passing the packet and an indication of the path. The message send routine determines that the next session and conversion routine as indicated by path entry 151 has already been found. The message send routine then invokes the instance of the conversion routine for the session. The conversion routine processes the packet and then invokes the message send routine 107. This processing continues until the message send routine invokes the demux routine 110 after the packet is processed by the conversion routine represented by path entry 153. The demux routine examines the path and determines that it has no more path entries. The demux routine then invokes the label map get routine 111 to identify the conversion routines for further processing of the packet. When the conversion routines are identified, the demux routine adds path entries 154, 155 to the path. The messages send routine invokes the conversion routine associated with path entry 154. Eventually, the conversion routine associated with path entry 155 performs the final processing for the path.

Figure 2:
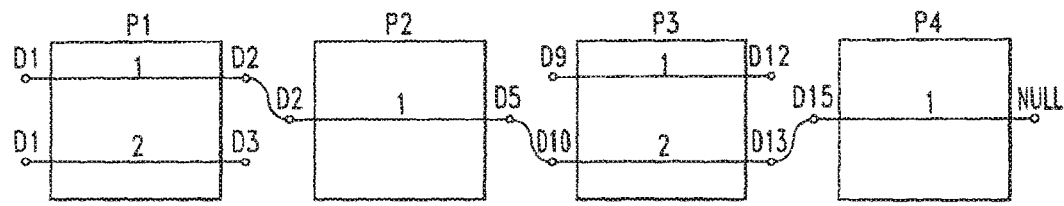
FIG. 2 is a block diagram illustrating a sequence of edges.

The label map get routine identifies a sequence of "edges" for converting data in one format into another format. Each edge corresponds to a conversion routine for converting data from one format to another. Each edge is part of a "protocol" (or more generally a component) that may include multiple related edges. For example, a protocol may have edges that each convert data in one format into several different formats. Each edge has an input format and an output format. The label map get routine identifies a sequence of edges such that the output format of each edge is compatible with the input format of another edge in the sequence, except for the input format of the first edge in the sequence and the output format of the last edge in the sequence. FIG. 2 is a block diagram illustrating a sequence of edges. Protocol PI includes an edge for converting format D1 to format D2 and an edge for converting format D1 to format D3; protocol P2 includes an edge for converting format D2 to format D5, and so on. A 30 sequence for converting format D 1 to format D 15 is shown by the curved lines and is defined by the address "P1:I, P2:1, P3:2, P4:7." When a packet of data in format D I is processed by this sequence, it is converted to format DIS. During the process, the packet of data is sequentially converted to format D2, D5, and D13. The output format of protocol P2, edge 1 (i.e., P2:1) is format D5, but the input format of P3:2 is format D10. The label map get routine uses an aliasing mechanism by which two formats, such as D5 and D10 are identified as being compatible. The use of aliasing allows different names of the same format or compatible formats to be correlated.

Figure 3:
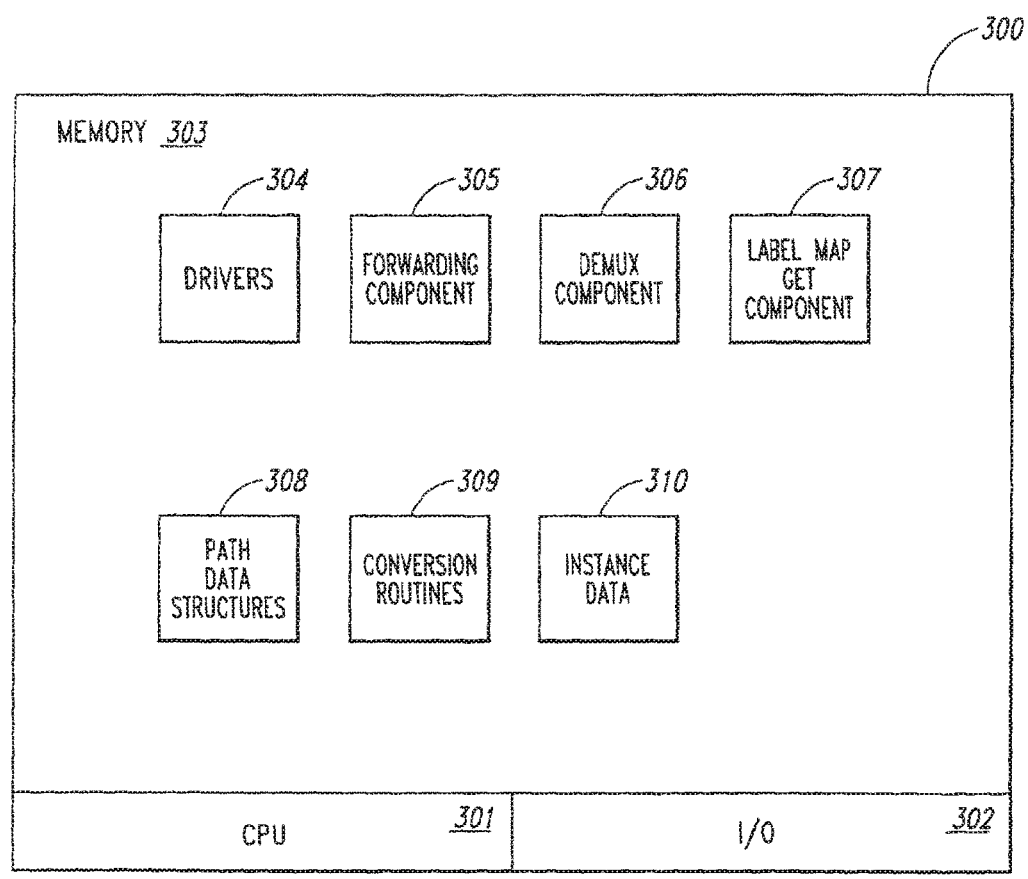
FIG. 3 is a block diagram illustrating components of the conversion system in one embodiment.

FIG. 3 is a block diagram illustrating components of the conversion system in one embodiment. The conversion system 300 can operate on a computer system with a central processing unit 301, I/O devices 302, and memory 303. The 110 devices may include an Internet connection, a connection to various output devices such as a television, and a connection to various input devices such as a television receiver. The media mapping system may be stored as instructions on a computer-readable medium, such as a disk drive, memory, or data transmission medium. The data structures of the media mapping system may also be stored on a computer-readable medium. The conversion system includes drivers 304, a•forwarding component 305, a demux component 306, a label map get component 307, path data structures 308, conversion routines 309, and instance data 310. Each driver receives data in a source format and forwards the data to the forwarding component. The forwarding component identifies the next conversion routine in the path and invokes that conversion routine to process a packet. The forwarding component may invoke the demux component to search for the next conversion routine and add that conversion routine to the path. The demux component may invoke the label map get component to identify the next conversion routine to process the packet. The demux component stores information defining the paths in the path structures. The conversion routines store their state information in the instance data.

Figure 4:
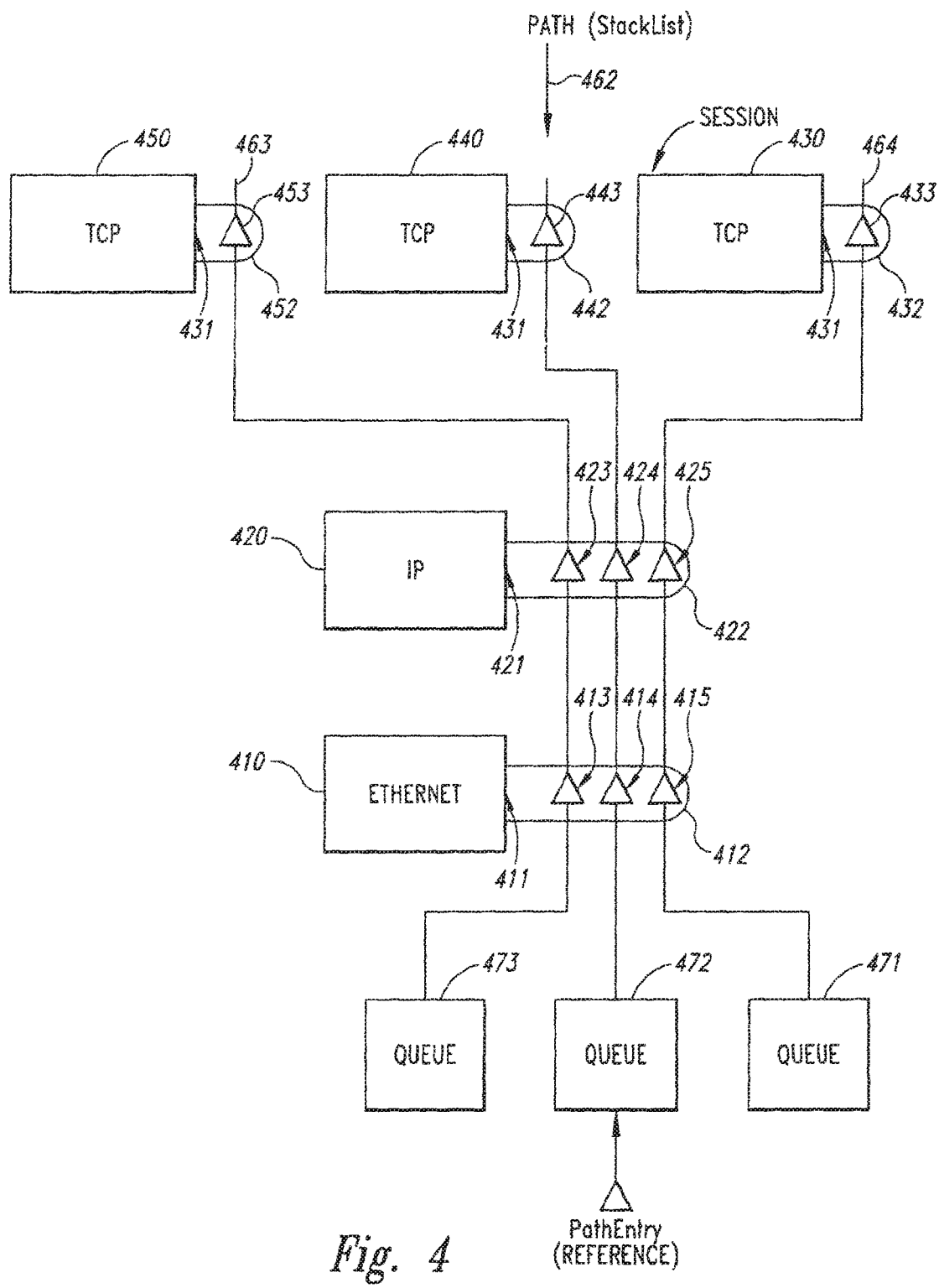
FIG. 4 is a block diagram illustrating example path data structures in one embodiment.

FIG. 4 is a block diagram illustrating example path data structures in one embodiment. The demux component identifies a sequence of "edges" for converting data in one format into another format by invoking the label map get component. Each edge corresponds to a conversion routine for converting data from one format to another. As discussed above, each edge is part of a "protocol" that may include multiple related edges. For example, a protocol may have edges that each convert data in one format into several different formats. Each edge has as an input format ("input label") and an output format ("output label"). Each rectangle represents a session 410, 420, 430, 440, 450 for a protocol. A session corresponds to an instance of a protocol. That is, the session includes the protocol and state information associated with that instance of the protocol. Session 410 corresponds to a session for an Ethernet protocol; session 420 corresponds to a session for an IP protocol; and sessions 430, 440, 450 correspond to sessions for a TCP protocol. FIG. 4 illustrates three paths 461, 462, 463. Each path includes edges 411, 421, 431. The paths share the same Ethernet session 410 and IP session 420, but each path has a unique TCP session 430, 440, 450. Thus, path 461 includes sessions 410, 420, and 430; path 462 includes sessions 410, 420, and 440; and path 463 includes sessions 410, 420, and 450. The conversion system represents each path by a sequence of path entry structures. Each path entry structure is represented by a triangle. Thus, path 461 is represented by path entries 415, 425, and 433. The conversion system represents the path entries of a path by a stack list. Each path also has a queue 471, 472, 473 associated with it. Each queue stores the messages that are to be processed by the conversion routines of the edges of the path. Each session includes a binding 412, 422, 432, 442, 452 that is represented by an oblong shape adjacent to the corresponding edge. A binding for an edge of a session represents those paths that include the edge. The binding 412 indicates that three paths are bound (or "nailed") to edge 411 of the Ethernet session 410. The conversion system uses a path list to track the paths that are bound to a binding. The path list of binding 412 identifies path entries 413, 414, and 415.

Figure 5:
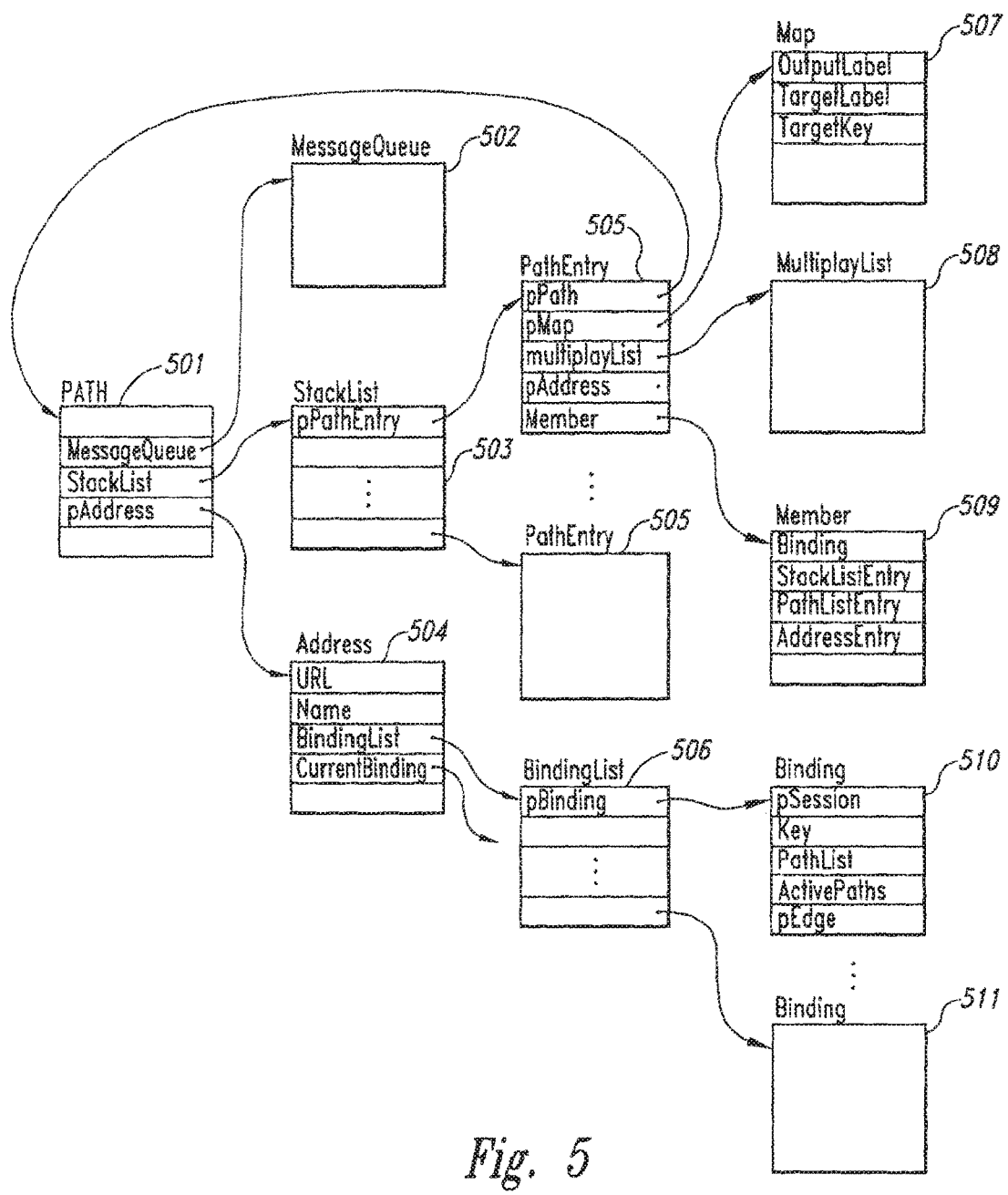
FIG. 5 is a block diagram that illustrates the interrelationship of the data structures of a path.

FIG. 5 is a block diagram that illustrates the interrelationship of the data structures of a path. Each path has a corresponding path structure 501 that contains status information and pointers to a message queue structure 502, a stack list structure 503, and a path address structure 504. The status of a path can be extend, continue, or end. Each message handler returns a status for the path. The status of extend means that additional path entries should be added to the path. The status of end means that this path should end at this point and subsequent processing should continue at a new path. The status of continue means that the protocol does not care how the path is handled. In one embodiment, when a path has a status of continue, the system creates a copy of the path and extends the copy. The message queue structure identifies the messages (or packets of a message) that are queued up for processing by the path and identifies the path entry at where the processing should start. The stack list structure contains a list of pointers to the path entry structures 505 that comprise the path. Each path entry structure contains a pointer to the corresponding path data structure, a pointer to a map structure 507, a pointer to a multiplex list 508, a pointer to the corresponding path address structure, and a pointer to a member structure 509. A map structure identifies the output label of the edge of the path entry and optionally a target label and a target key. A target key identifies the session associated with the protocol that converts the packet to the target label. (The terms "media," "label," and "format" are used interchangeably to refer to the output of a protocol.) The multiplex list is used during the demux process to track possible next edges when a path is being identified as having more than one next edge. The member structure indicates that the path entry represents an edge of a path and contains a pointer to a binding structure to which the path entry is associated (or "nailed"), a stack list entry is the position of the path entry within the associated stack list, a path list entry is the position of the path entry within the associated path list of a binding and an address entry is the position of the binding within the associated path address. A path address of a path identifies the bindings to which the path entries are bound. The path address structure contains a URL for the path, the name of the path identified by the address, a pointer to a binding list structure 506, and the identification of the current binding within the binding list. The URL (e.g., "protocol://tcp(0)/ip (0)/eth(0)") identifies conversion routines (e.g., protocols and edges) of a path in a human-readable format. The URL (universal resource locator) includes a type field (e.g., "protocol") followed by a sequence of items (e.g., "tcp(0)"). The type field specifies the format of the following information in the URL, that specifies that the type field is followed by a sequence of items. Each item identifies a protocol and an edge (e.g., the protocol is "tcp" and the edge is "0"). In one embodiment, the items of a URL may also contain an identifier of state information that is to be used when processing a message. These URLs can be used to illustrate to a user various paths that are available for processing a message. The current binding is the last binding in the path as the path is being built. The binding list structure contains a list of pointers to the binding structures associated with the path. Each binding structure 510 contains a pointer to a session structure, a pointer to an edge structure, a key, a path list structure, and a list of active paths through the binding. The key identifies the state information for a session of a protocol. A path list structure contains pointers to the path entry structures associated with the binding.

Figure 6:
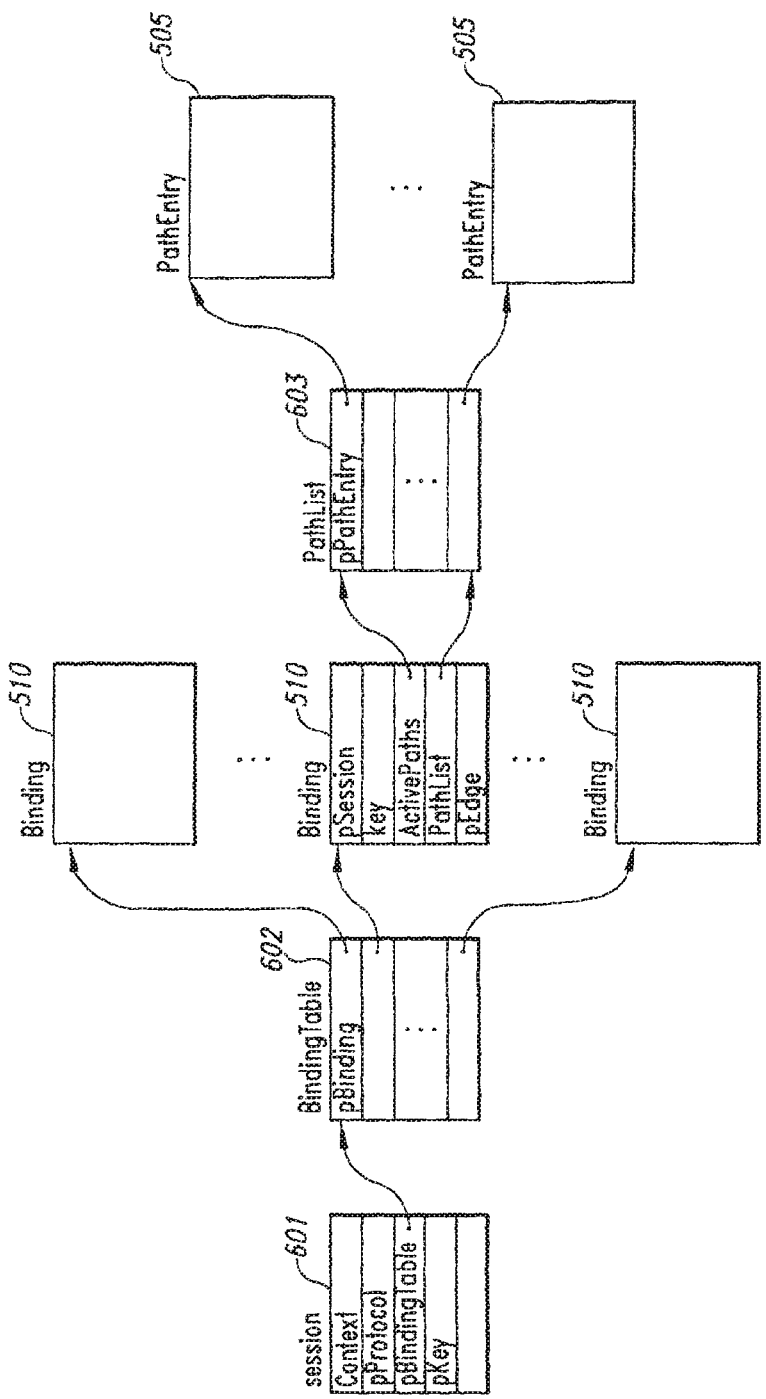
FIG. 6 is a block diagram that illustrates the interrelationship of the data structures associated with a session.

FIG. 6 is a block diagram that illustrates the interrelationship of the data structures associated with a session. A session structure 601 contains the context for the session, a pointer to a protocol structure for the session, a pointer to a binding table structure 602 for the bindings associated with the session, and the key. The binding table structure contains a list of pointers to the binding structures 510 for the session. The binding structure is described above with reference to FIG. 5. The path list structure 603 of the binding structure contains a list of pointers to path entry structures 505. The path entry structures are described with reference to FIG. 5.

Figure 7A:
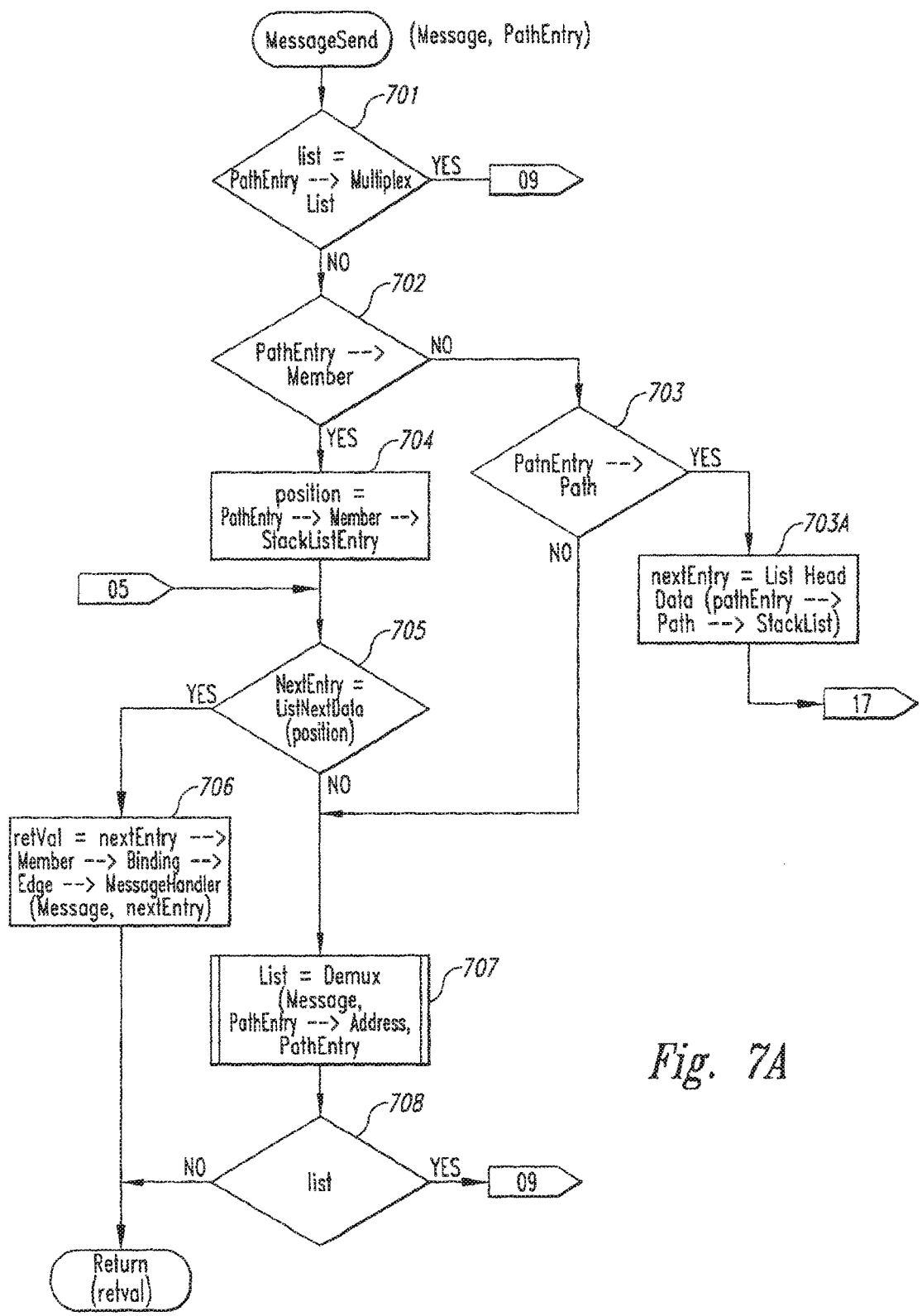
FIGS. 7 A, 7B, and 7C comprise a flow diagram illustrating the processing of the message send routine.

FIGS. 7A, 7B, and 7C comprise a flow diagram illustrating the processing of the message send routine. The message send routine is passed a message along with the path entry associated with the session that last processed the message. The message send routine invokes the message handler of the next edge in the path or queues the message for processing by a path. The message handler invokes the demux routine to identify the next path entry of the path. When a driver receives a message, it invokes the message send routine passing a reference path entry. The message send routine examines the passed path entry to determine (1) whether multiple paths branch from the path of the passed path entry, (2) whether the passed path entry is a reference with an associated path, or (3) whether the passed path entry is a member with a next path entry. If multiple paths branch from the path of the passed path entry, then the routine recursively invokes the message send routine for each path. If the path entry is a reference with an associated path, then the driver previously invoked the message send routine, which associated a path with the reference path entry, and the routine places the message on the queue for the path. If the passed path entry is a member with a next path entry, then the routine invokes the message handler (i.e., conversion routine of the edge) associated with the next path entry. If the passed path entry is a reference without an associated path or is a member without a next path entry, then the routine invokes the demux routine to identify the next path entry. The routine then recursively invokes the messages send routine passing that next path entry. In decision block 701, if the passed path entry has a multiplex list, then the path branches off into multiple paths and the routine continues at block 709, else the routine continues at block 702. A packet may be processed by several different paths. For example, if a certain message is directed to two different output devices, then the message is processed by two different paths. Also, a message may need to be processed by multiple partial paths when searching for a complete path. In decision block 702, if the passed path entry is a member, then either the next path entry indicates a nailed binding or the path needs to be extended and the routine continues at block 704, else the routine continues at block 703. A nailed binding is a binding (e.g., edge and protocol) is associated with a session. In decision block 703, the passed path entry is a reference and if the passed path entry has an associated path, then the routine can queue the message for the associated path and the routine continues at block 703A, else the routine needs to identify a path and the routine continues at block 707. In block 703A, the routine sets the entry to the first path entry in the path and continues at block 717. In block 704, the routine sets the variable position to the stack list entry of the passed path entry. In decision block 705, the routine sets the variable next entry to the next path entry in the path. If there is a next entry in the path, then the next session and edge of the protocol have been identified and the routine continues at block 706, else the routine continues at block 707. In block 706, the routine passes the message to the message handler of the edge associated with the next entry and then returns. In block 706, the routine invokes the demux routine passing the passed message, the address of the passed path entry, and the passed path entry. The demux routine returns a list of candidate paths for processing of the message. In decision block 708, if at least one candidate path is returned, then the routine continues at block 709, else the routine returns.

Blocks 709-716 illustrate the processing of a list of candidate paths that extend from the passed path entry. In blocks 710-716, the routine loops selecting each candidate path and sending the message to be process by each candidate path. In block 710, the routine sets the next entry to the first path entry of the next candidate path. In decision block 711, if all the candidate paths have not yet been processed, then the routine continues at block 712, else the routine returns. In decision block 712, if the next entry is equal to the passed path entry, then the path is to be extended and the routine continues at block 705, else the routine continues at block 713. The candidate paths include a first path entry that is a reference path entry for new paths or that is the last path entry of a path being extended. In decision block 713, if the number of candidate paths is greater than one, then the routine continues at block 714, else the routine continues at block 718. In decision block 714, if the passed path entry has a multiplex list associated with it, then the routine continues at block 716, else the routine continues at block 715. In block 715, 11 the routine associates the list of candidate path with the multiplex list of the passed path entry and continues at block 716. In block 716, the routine sends the message to the next entry by recursively invoking the message send routine. The routine then loops to block 710 to select the next entry associated with the next candidate path.

Blocks 717-718 are performed when the passed path entry is a reference path entry that has a path associated with it. In block 717, if there is a path associated with the next entry, then the routine continues at block 718, else the routine returns. In block 718, the routine queues the message for the path of the next entry and then returns.

Figure 8:
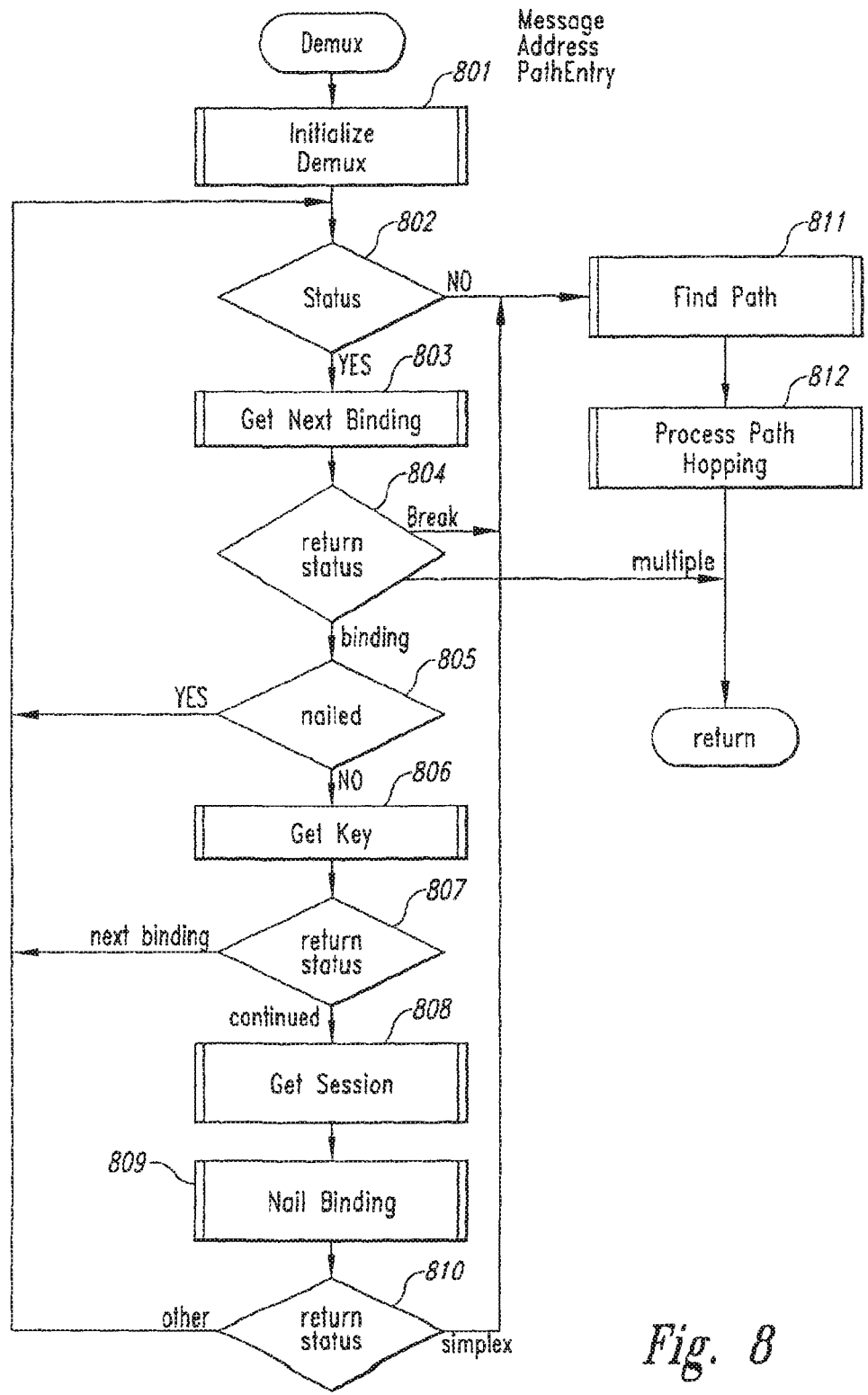
FIG. 8 is a flow diagram of the demux routine.

FIG. 8 is a flow diagram of the demux routine. This routine is passed the packet (message) that is received, an address structure, and a path entry structure. The demux routine extends a path, creating one if necessary. The routine loops identifying the next binding (edge and protocol) that is to process the message and "nailing" the binding to a session for the message, if not already nailed. After identifying the nailed binding, the routine searches for the shortest path through the nailed binding, creating a path if none exists. In block 801, the routine invokes the initialize demux routine. In blocks 802-810, the routine loops identifying a path or portion of a path for processing the passed message. In decision block 802, if there is a current status, which was returned by the demux key routine that was last invoked (e.g., continue, extend, end, or postpone), then the routine continues at block 803, else the routine continues at block 811. In block 803, the routine invokes the get next binding routine. The get next binding routine returns the next binding in the path. The binding is the edge of a protocol. That routine extends the path as appropriate to include the binding. The routine returns a return status of break, binding, or multiple. The return status of binding indicates that the next binding in the path was found by extending the path as appropriate and the routine continues to "nail" the binding to a session as appropriate. The return status of multiple means that multiple trails (e.g., candidate paths) were identified as possible extensions of the path. In a decision block 804, if the return status is break, then the routine continues at block 811. If the return status is multiple, then the routine returns. If the return status is binding, then the routine continues at block 805. In decision block 805, if the retrieved binding is nailed as indicated by being assigned to a session, then the routine loops to block 802, else the routine continues at block 806. In block 806, the routine invokes the get key routine of the edge associated with the binding. The get key routine creates the key for the session associated with the message. If a key cannot be created until subsequent bindings are processed or because the current binding is to be removed, then the get key routine returns a next binding status, else it returns a continue status. In decision block 807, if the return status of the get key routine is next binding, then the routine loops to block 802 to get the next binding, else the routine continues at block 808. In block 808, the routine invokes the routine get session. The routine get session returns the session associated with the key, creating a new session if necessary. In block 809, the routine invokes the routine nail binding. The routine nail binding retrieves the binding if one is already nailed to the session. Otherwise, that routine nails the binding to the session. In decision block 810, if the nail binding routine returns a status of simplex, then the routine continues at block 811 because only one path can use the session, else the routine loops to block 802. Immediately upon return from the nail binding routine, the routine may invoke a set map routine of the edge passing the session and a map to allow the edge to set its map. In block 811, the routine invokes the find path routine, which finds the shortest path through the binding list and creates a path if necessary. In block 812, the routine invokes the process path hopping routine, which determines whether the identified path is part of a different path. Path hopping occurs when, for example, IP fragments are built up along separate paths, but once the fragments are built up they can be processed by the same subsequent path.

Figure 9:
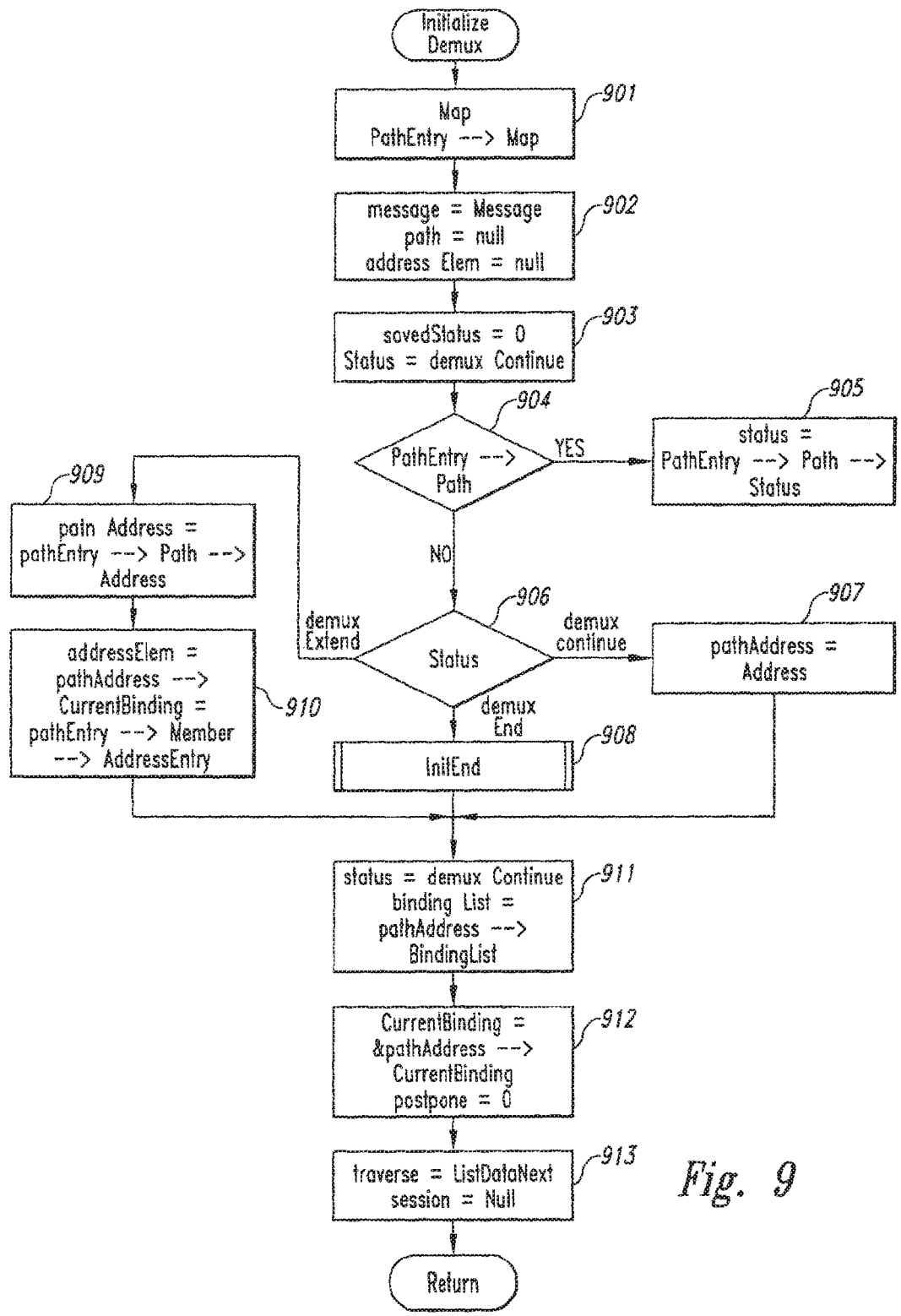
FIG. 9 is a flow diagram of the initialize demux routine.

FIG. 9 is a flow diagram of the initialize demux routine. This routine is invoked to initialize the local data structures that are used in the demux process and to identify the initial binding. The demux routine finds the shortest path from the initial binding to the final binding. If the current status is demux extend, then the routine is to extend the path of the passed path entry by adding additional path entries. If the current status is demux end, then the demux routine is ending the current path. If the current status is demux continue, then the demux routine is in the process of continuing to extend or in the process of starting a path identified by the passed address. In block 901, the routine sets the local map structure to the map structure in the passed path entry structure. The map structure identifies the output label, the target label, and the target key. In the block 902, the routine initializes the local message structure to the passed message structure and initializes the pointers path and address element to null. In block 903, the routine sets of the variable saved status to 0 and the variable status to demux continue. The variable saved status is used to track the status of the demux process when backtracking to nail a binding whose nail was postponed. In decision block 904, if the passed path entry is associated with a path, then the routine continues at block 905, else the routine continues at block 906. In block 905, the routine sets the variable status to the status of that path. In block 906, if the variable status is demux continue, then the routine continues at block 907. If the variable status is demux end, then the routine continues at block 908. If the variable status is demux extend, then the routine continues at block 909. In block 907, the status is demux continue, and the routine sets the local pointer path address to the passed address and continues at block 911. In block 908, the status is demux end, and the routine invokes the init end routine and continues at block 911. In block 909, the status is demux extend, and the routine sets the local path address to the address of the path that contains the passed path entry. In block 910, the routine sets the address element and the current binding of the path address pointed to by the local pointer path address to the address entry of the member structure of the passed path entry. In the block 911, the routine sets the local variable status to demux continue and sets the local binding list structure to the binding list structure from the local path address structure. In block 912, the routine sets the local pointer current binding to the address of the current binding pointed to by local pointer path address and sets the local variable postpone to 0. In block 913, the routine sets the function traverse to the function that retrieves the next data in a list and sets the local pointer session to null. The routine then returns.

Figure 10:
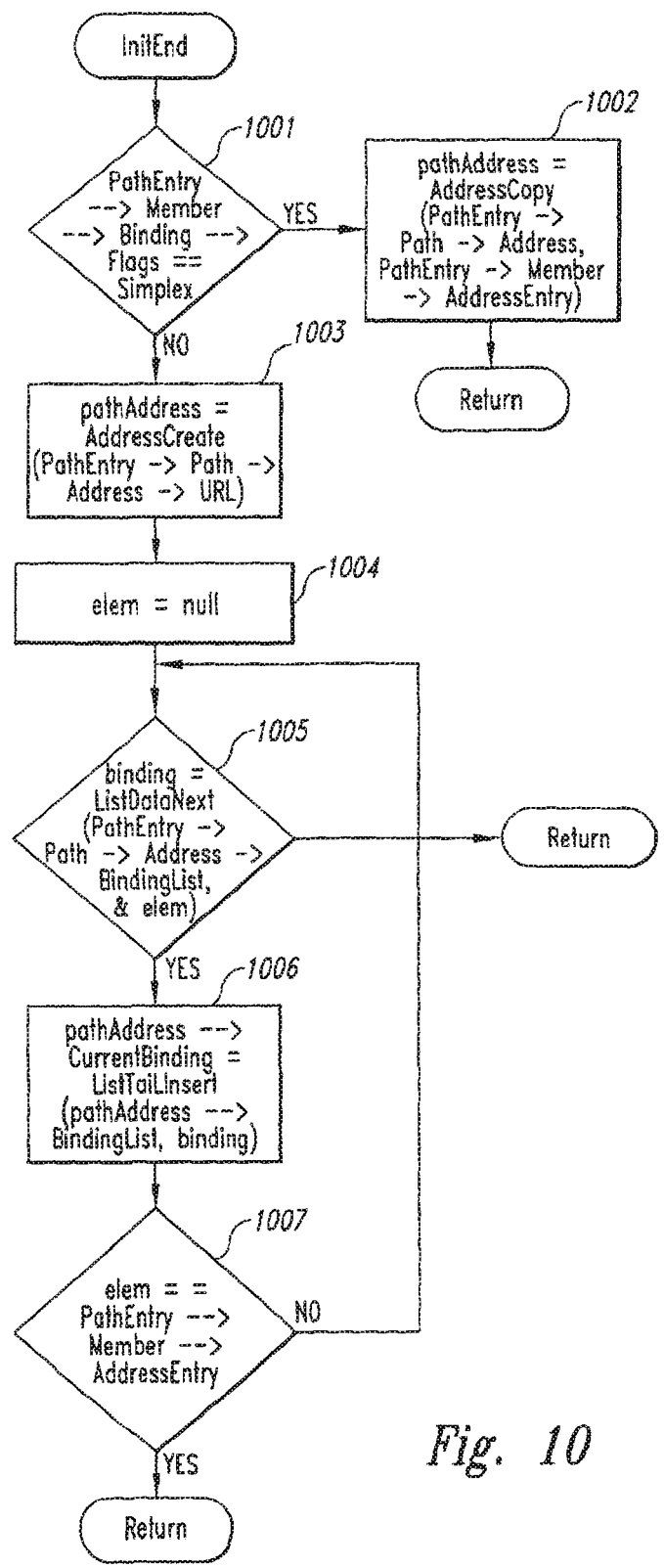
FIG. 10 is a flow diagram of the init end routine.

FIG. 10 is a flow diagram of the init end routine. If the path is simplex, then the routine creates a new path from where the other one ended, else the routine creates a copy of the path. In block 1001, if the binding of the passed path entry is simplex (i.e., only one path can be bound to this binding), then the routine continues at block 1002, else the routine continues at block 1003. In block 1002, the routine sets the local pointer path address to point to an address structure that is a copy of the address structure associated with the passed path entry structure with its current binding to the address entry associated with the passed path entry structure, and then returns. In block 1003, the routine sets the local pointer path address to point to an address structure that contains the URL of the path that contains the passed path entry. In block 1004, the routine sets the local pointer element to null to initialize the selection of the bindings. In blocks 1005 through 1007, the routine loops adding all the bindings for the address of the passed path entry that include and are before the passed path entry to the address pointed to by the local path address. In block 1005, the routine retrieves the next binding from the binding list starting with the first. If there is no such binding, then the routine returns, else the routine continues at block 1006. In block 1006, the routine adds the binding to the binding list of the local path address structure and sets the current binding of the local variable path address. In the block 1007, if the local pointer element is equal to the address entry of the passed path entry, then the routine returns, else the routine loops to block 1005 to select the next binding.

Figure 11:
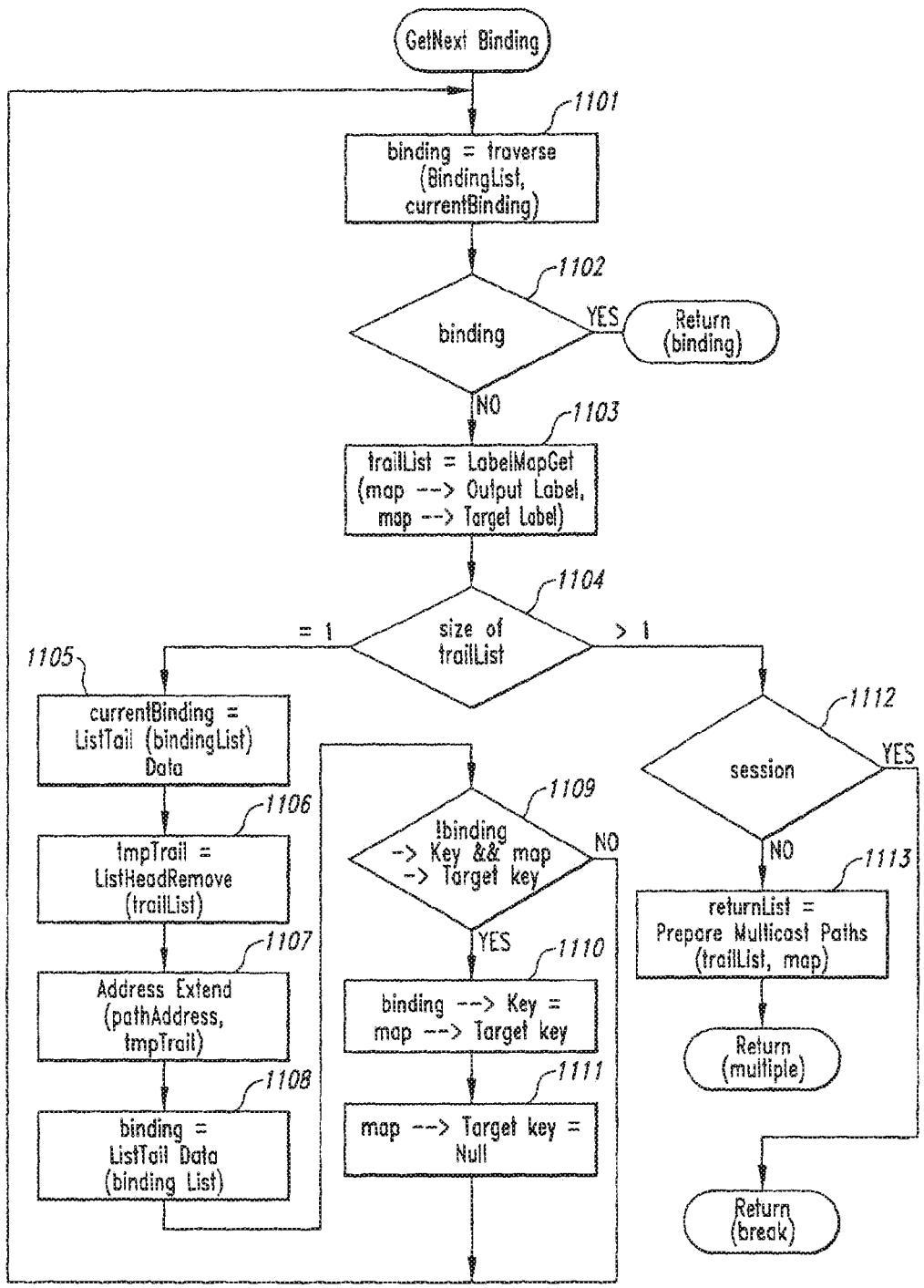
FIG. 11 is a flow diagram of a routine to get the next binding.

FIG. 11 is a flow diagram of a routine to get the next binding. This routine returns the next binding from the local binding list. If there is no next binding, then the routine invokes the routine label map get to identify the list of edges ("trails") that will map the output label to the target label. If only one trail is identified, then the binding list of path address is extended by the edges of the trail. If multiple trails are identified, then a path is created for each trail and the routine returns so that the demux process can be invoked for each created path. In block 1101, the routine sets the local pointer binding to point to the next or previous (as indicated by the traverse function) binding in the local binding list. In block 1102, if a binding was found, then the routine returns an indication that a binding was found, else the routine continues at block 1103. In block 1103, the routine invokes the label map get function passing the output label and target label of the local map structure. The label map get function returns a trail list. A trail is a list of edges from the output label to the target label. In decision block 1104, if the size of the trail list is one, then the routine continues at block 1105, else the routine continues at block 1112. In blocks 1105-1111, the routine extends the binding list by adding a binding data structure for each edge in the trail. The routine then sets the local binding to the last binding in the binding list. In block 1108, the routine sets the local pointer current binding to point to the last binding in the local binding list. In block 1106, the routine sets the local variable temp trail to the trail in the trail list. In block 1107, the routine extends the binding list by temp trail by adding a binding for each edge in the trail. These bindings are not yet nailed. In block 1108, the routine sets the local binding to point to the last binding in the local binding list. In decision block 1109, if the local binding does not have a key for a session and the local map has a target key for a session, then the routine sets the key for the binding to the target key of the local map and continues at block 1110, else the routine loops to block 1101 to retrieve the next binding in path. In block 1110, the routine sets the key of the local binding to the target key of the local map. In block 1111, the routine sets the target key of the local map to null and then loop to block 1101 to return the next binding. In decision block 1112, if the local session is set, then the demultiplexing is already in progress and the routine returns a break status. In block 1113, the routine invokes a prepare multicast paths routine to prepare a path entry for each trail in the trail list. The routine then returns a multiple status.

Figure 12:
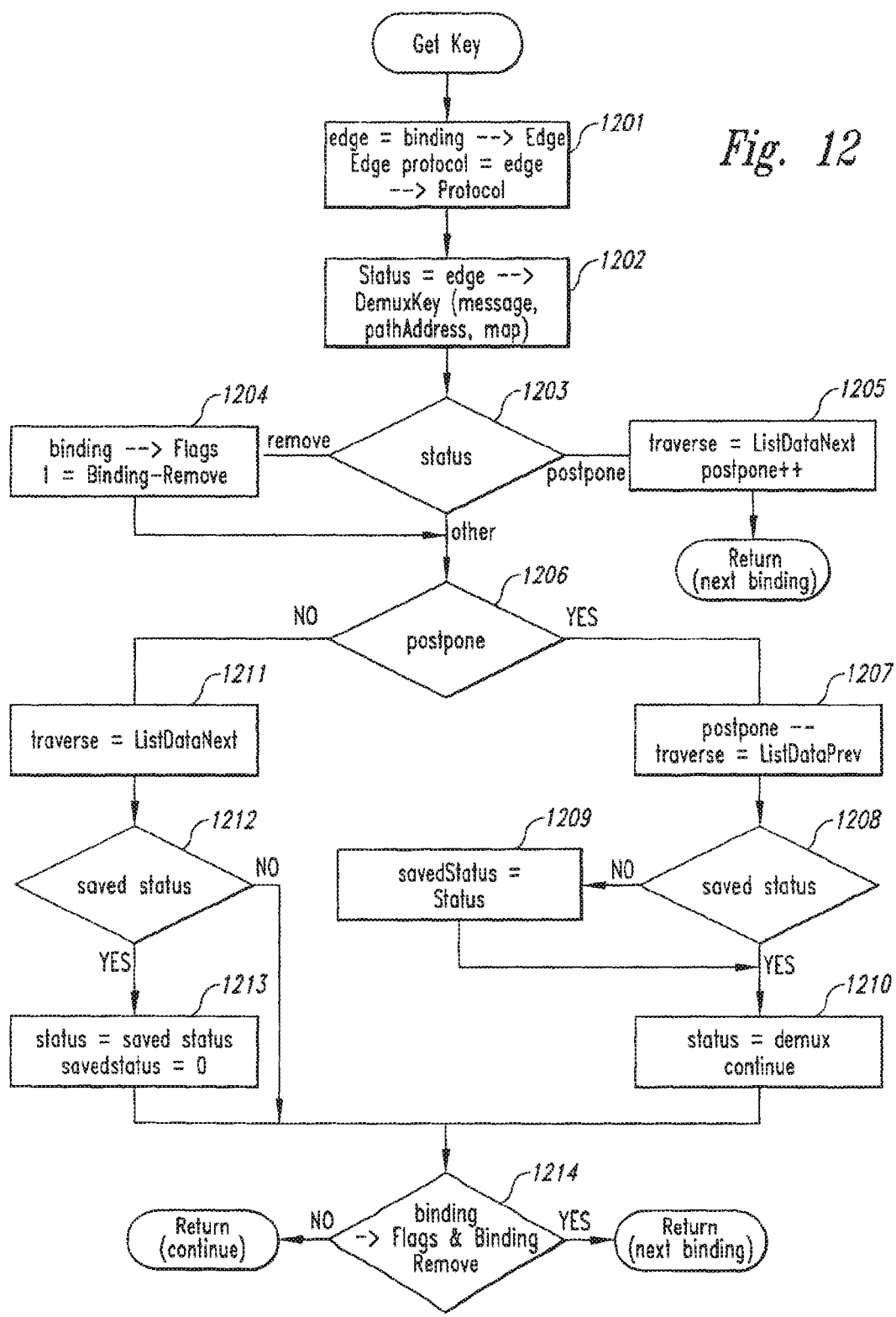
FIG. 12 is a flow diagram of the get key routine.

FIG. 12 is a flow diagram of the get key routine. The get key routine invokes an edge's demux key routine to retrieve a key for the session associated with the message. The key identifies the session of a protocol. The demux key routine creates the appropriate key for the message. The demux key routine returns a status of remove, postpone, or other. The status of remove indicates that the current binding should be removed from the path. The status of postpone indicates that the demux key routine cannot create the key because it needs information provided by subsequent protocols in the path. For example, a TCP session is defined by a combination of a remote and local port address and an IP address. Thus, the TCP protocol postpones the creating of a key until the IP protocol identifies the IP address. The get key routine returns a next binding status to continue at the next binding in the path. Otherwise, the routine returns a continue status. In block 1201, the routine sets the local edge to the edge of the local binding (current binding) and sets the local protocol to the protocol of the local edge. In block 1202, the routine invokes the demux key routine of the local edge passing the local message, local path address, and local map. The demux key routine sets the key in the local binding. In decision block 1203, if the demux key routine returns a status of remove, then the routine continues at block 1204. If the demux key routine returns a status of postpone, then the routine continues at block 1205, else the routine continues at block 1206. In block 1204, the routine sets the flag of the local binding to indicate that the binding is to be removed and continues at block 1206. In block 1205, the routine sets the variable traverse to the function to list the next data, increments the variable postpone, and then returns a next binding status. In blocks 1206-1214, the routine processes the postponing of the creating of a key. In blocks 1207-1210, if the creating of a key has been postponed, then the routine indicates to backtrack on the path, save the demux status, and set the demux status to demux continue. In blocks 1211-1213, if the creating of a key has not been postponed, then the routine indicates to continue forward in the path and to restore any saved demux status. The save demux status is the status associated by the binding where the backtrack started. In decision block 1206, if the variable postpone is set, then the routine continues at block 1207, else the routine continues at block 1211. In block 1207, the routine decrements the variable postpone and sets the variable traverse to the list previous data function. In decision block 1208, if the variable saved status is set, then the routine continues at block 1210, else the routine continues at block 1209. The variable saved status contains the status of the demux process when the demux process started to backtrack. In block 1209, the routine sets the variable saved status to the variable status. In block 1210, the routine sets the variable status to demux continue and continues at block 1214. In block 1211, the routine sets the variable traverse to the list next data function. In decision block 1212, if the variable saved status in set, then the routine continues at block 1213, else the routine continues at block 1214. In block 1213, the routine sets the variable status to the variable saved status and sets the variable saved status to 0. In decision block 1214, if the local binding indicates that it is to be removed, then the routine returns a next binding status, else the routine returns a continue status.

Figure 13:
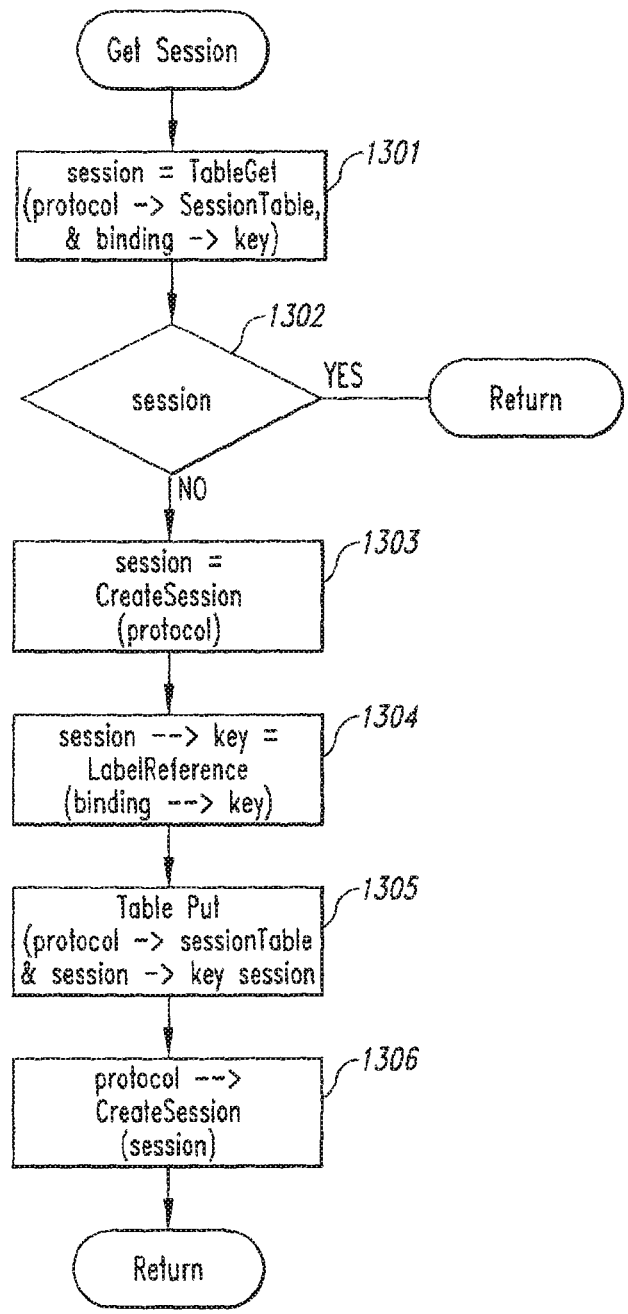
FIG. 13 is a flow diagram of the get session routine.

FIG. 13 is a flow diagram of the get session routine. This routine retrieves the session data structure, creating a data structure session if necessary, for the key indicated by the binding. In block 1301, the routine retrieves the session from the session table of the local protocol indicated by the key of the local binding. Each protocol maintains a mapping from each key to the session associated with the key. In decision block 1302, if there is no session, then the routine continues at block 1303, else the routine returns. In block 1303, the routine creates a session for the local protocol. In block 1304, the routine initializes the key for the local session based on the key of the local binding. In block 1305, the routine puts the session into the session table of the local protocol. In block 1306, the routine invokes the create session function of the protocol to allow the protocol to initialize its context and then returns.

Figure 14:
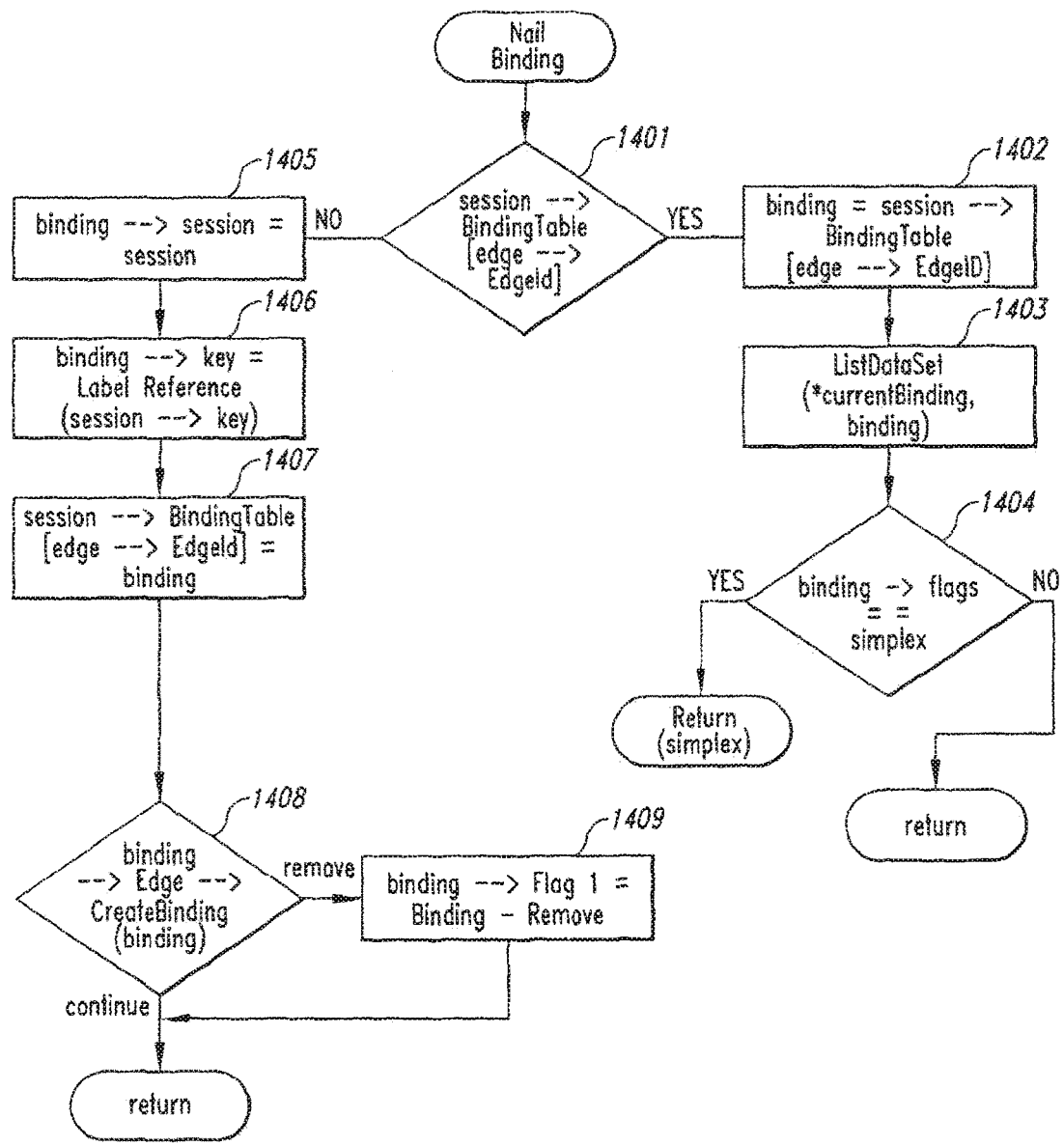
FIG. 14 is a flow diagram of the nail binding routine.

FIG. 14 is a flow diagram of the nail binding routine. This routine determines whether a binding is already associated with ("nailed to") the session. If so, the routine returns that binding. If not, the routine associates the binding with the session. The routine returns a status of simplex to indicate that only one path can extend through the nailed binding. In decision block 1401, if the binding table of the session contains an entry for the edge, then the routine continues at block 1402, else the routine continues at block 1405. In block 1402, the routine sets the binding to the entry from the binding table of the local session for the edge. In block 1403, the routine sets the current binding to point to the binding from the session. In block 1404, if the binding is simplex, then the routine returns a simplex status, else the routine returns. Blocks 1405 through 1410 are performed when there is no binding in the session for the edge. In block 1405, the routine sets the session of the binding to the variable session. In block 1406, the routine sets the key of the binding to the key from the session. In block 1407, the routine sets the entry for the edge in the binding table of the local session to the binding. In block 1408, the routine invokes the create binding function of the edge of the binding passing the binding so the edge can initialize the binding. If that function returns a status of remove, the routine continues at block 1409. In block 1409, the routine sets the binding to be removed and then returns.

Figure 15:
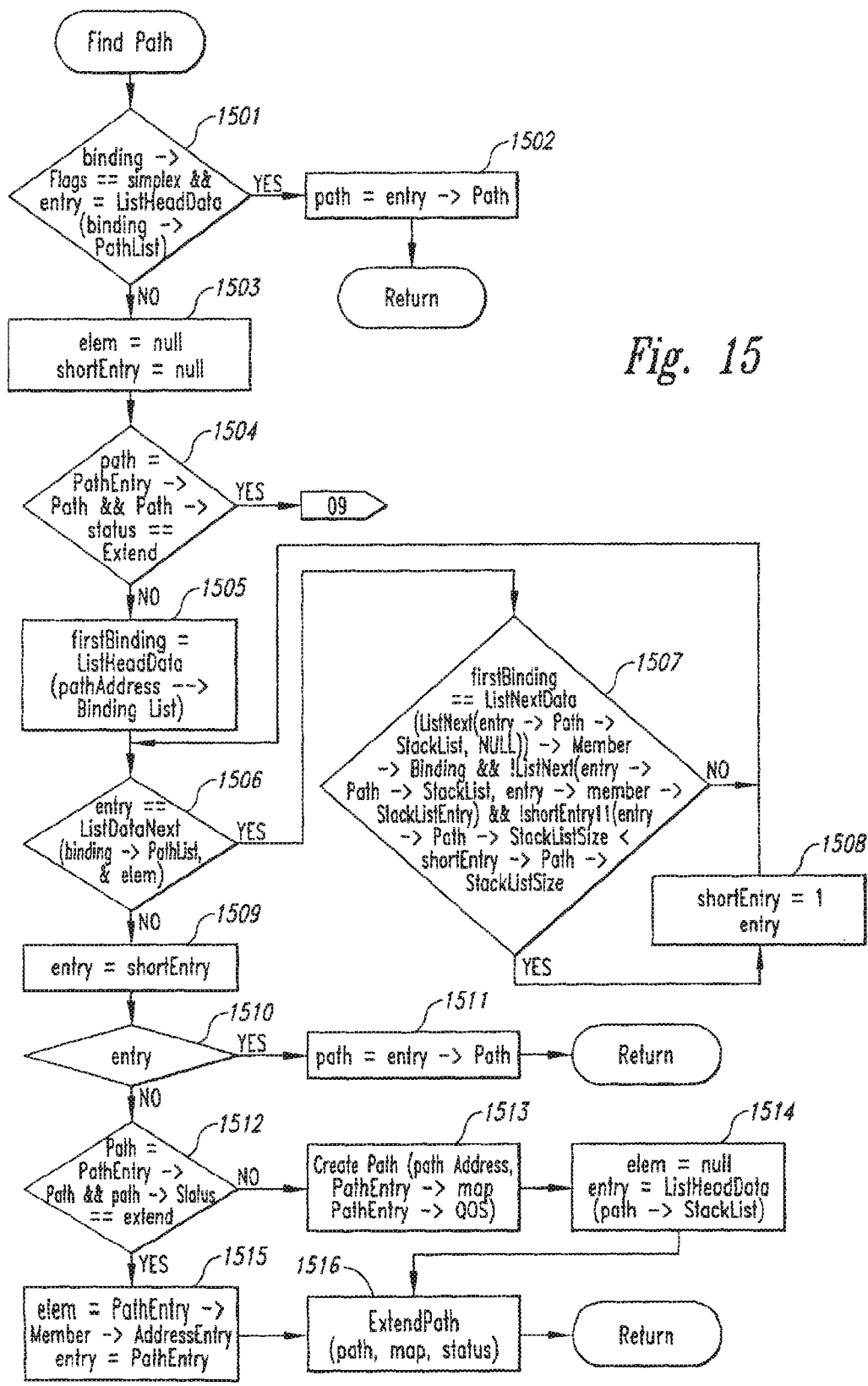
FIG. 15 is a flow diagram of the find path routine.

FIG. 15 is a flow diagram of the find path routine. The find path routine identifies the shortest path through the binding list. If no such path exists, then the routine extends a path to include the binding list. In decision block 1501, if the binding is simplex and a path already goes through this binding (returned as an entry), then the routine continues at block 1502, else the routine continues at block 1503. In block 1502, the routine sets the path to the path of the entry and returns. In block 1503, the routine initializes the pointers element and short entry to null. In block 1504, the routine sets the path to the path of the passed path entry. If the local path is not null and its status is demux extend, then the routine continues at block 1509, else the routine continues at block 1505. In blocks 1505-1508, the routine loops identifying the shortest path through the bindings in the binding list. The routine loops selecting each path through the binding. The selected path is eligible if it starts at the first binding in the binding list and the path ends at the binding. The routine loops setting the short entry to the shortest eligible path found so far. In block 1505, the routine sets the variable first binding to the first binding in the binding list of the path address. In block 1506, the routine selects the next path (entry) in the path list of the binding starting with the first. If a path is selected (indicating that there are more paths in the binding), then the routine continues at block 1507, else the routine continues at block 1509. In block 1507, the routine determines whether the selected path starts at the first binding in the binding list, whether the selected path ends at the last binding in the binding list, and whether the number of path entries in the selected path is less than the number of path entries in the shortest path selected so far. If these conditions are all satisfied, then the routine continues at block 1508, else the routine loops to block 1506 to select the next path (entry). In block 1508, the routine sets the shortest path (short entry) to the selected path and loops to block 1506 to select the next path through the binding. In block 1509, the routine sets the selected path (entry) to the shortest path. In decision block 1510, if a path has been found, then the routine continues at block 1511, else the routine continues at block 1512. In block 1511, the routine sets the path to the path of the selected path entry and returns. Blocks 1512-1516 are performed when no paths have been found. In block 1512, the routine sets the path to the path of the passed path entry. If the passed path entry has a path and its status is demux extend, then the routine continues at block 1515, else the routine continues at block 1513. In block 1513, the routine creates a path for the path address. In block 1514, the routine sets the variable element to null and sets the path entry to the first element in the stack list of the path. In block 1515, the routine sets the variable element to be address entry of the member of the passed path entry and sets the path entry to the passed path entry. In block 1516, the routine invokes the extend path routine to extend the path and then returns. The extend path routine creates a path through the bindings of the binding list and sets the path status to the current demux status.

Figure 16:
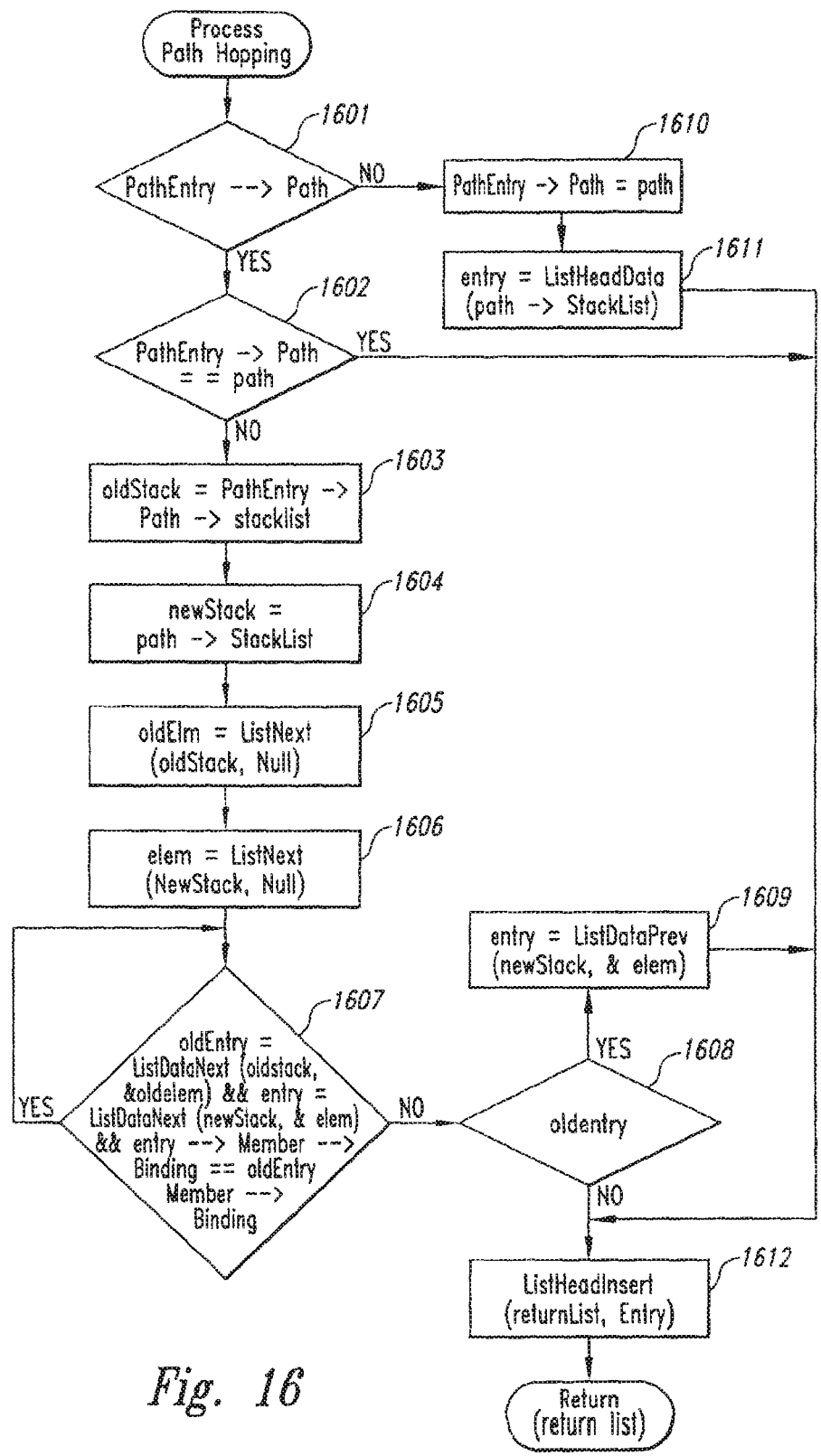
FIG. 16 is a flow diagram of the process of path hopping routine.

FIG. 16 is a flow diagram of the process of path hopping routine. Path hopping occurs when the path through the binding list is not the same path as that of the passed path entry. In decision block 1601, if the path of the passed path entry is set, then the routine continues at block 1602, else the routine continues at block 1609. In decision block 1602, if the path of the passed path entry is equal to the local path, then the routine continues at 1612, else path hopping is occurring and the routine continues at block 1603. In blocks 1603-1607, the routine loops positioning pointers at the first path entries of the paths that are not at the same binding. In block 1603, the routine sets the variable old stack to the stack list of the path of the passed path entry. In block 1604, the routine sets the variable new stack to the stack list of the local path. In block 1605, the routine sets the variable old element to the next element in the old stack. In block 1606, the routine sets the variable element to the next element in the new stack. In decision block 1607, the routine loops until the path entry that is not in the same binding is located. In decision block 1608, if the variable old entry is set, then the routine is not at the end of the hopped from path and the routine continues at block 1609, else routine continues at block 1612. In block 1609, the routine sets the variable entry to the previous entry in the hopped-to path. In block 1610, the routine sets the path of the passed path entry to the local path. In block 1611, the routine sets the local entry to the first path entry of the stack list of the local path. In block 1612, the routine inserts an entry into return list and then returns.

Although the conversion system has been described in terms of various embodiments, the invention is not limited to these embodiments. Modification within the spirit of the invention will be apparent to those skilled in the art. For example, a conversion routine may be used for routing a message and may perform no conversion of the message. Also, a reference to a single copy of the message can be passed to each conversion routine or demux key routine. These routines can advance the reference past the header information for the protocol so that the reference is positioned at the next header. After the demux process, the reference can be reset to point to the first header for processing by the conversion routines in sequence. The scope of the invention is defined by the claims that follow.

What is claimed is:

1. A method, comprising:
  receiving, at a computing device having a processing circuit, a packet of a message;
  determining, by the computing device, a key value for the packet, wherein the key value is determined based on one or more headers in the packet;
  using, by the computing device, the key value to determine whether the computing device is currently storing a previously created path for the key value;
  in response to determining that no path is currently stored for the key value, the computing device:
    identifying, using the key value, one or more routines for processing the packet, including a routine that is used to execute a Transmission Control Protocol (TCP) to convert packets having a TCP format into a different format;
    creating a path using the identified one or more routines; and
    processing the packet using the created path.

2. The method of claim 1, wherein the created path stores state information for at least one of the identified one or more routines.

3. The method of claim 1, wherein the created path stores state information for each of the identified one or more routines.

4. The method of claim 1, wherein the created path specifies an ordering in which the identified one or more routines are to be performed to process the packet.

5. The method of claim 4, wherein the ordering specifies that an application layer protocol is to be performed subsequent to the TCP.

6. The method of claim 5, wherein the application layer protocol is HTTP, and wherein the different format is HTTP.

7. The method of claim 4, wherein the ordering specifies that a first execution of the TCP is to be followed by execution of an application layer protocol, which is to be followed by a second execution of the TCP.

8. The method of claim 7, wherein the first execution of the TCP receives information from a network and the second execution of the TCP sends information via the network.

9. The method of claim 4, wherein the ordering specifies that the TCP is an initial one of the one or more routines.

10. The method of claim 4, wherein the ordering specifies that the TCP is to be performed after performing an Ethernet protocol.

11. The method of claim 1, further comprising:
receiving, at the computing device, a subsequent packet of the message;
determining, by the computing device based on the subsequent packet, the key value;
using, by the computing device, the key value to identify the created path for the message; and
processing, by the computing device, the subsequent packet using the path.

12. The method of claim 11, wherein processing the subsequent packet includes:
queuing the subsequent packet for one or more routines specified in the path; and
performing the one or more routines according to an ordering specified by the path, wherein performing at least one of the routines includes accessing state information stored in the path.

13. The method of claim 11, wherein packets of the message are all associated with a single TCP session.

14. The method of claim 1, wherein the key value includes an IP address and one or more port addresses.

15. A method, comprising:
receiving, at a computing device having a processing circuit, a packet of a message;
determining, by the computing device, a key value for the packet, wherein the key value is determined based on one or more headers in the packet;
using, by the computing device, the key value to determine whether the computing device is currently storing a previously created path for the key value;
in response to determining that no path is currently stored for the key value, the computing device:
identifying, using the key value, one or more routines for processing the packet, including a routine that is used to execute a User Datagram Protocol (UDP) to convert packets having a UDP format into a different format;
creating a path using the identified one or more routines; and
processing the packet using the created path.

16. An apparatus, comprising:
a network interface;
a processor circuit;
a memory storing program instructions executable by the processor circuit to:
receiving, via the network interface, a packet of a message;
determine a key value for the packet, wherein the key value is determined based on one or more headers in the packet;
use the key value to determine whether the apparatus is currently storing a path for the key value, wherein one or more routines are specified in the path for processing packets of the message;
in response to determining that no path is currently stored for the key value:
identify, using the key value, one or more routines for processing the packet, including a particular routine that is used to execute a Transmission Control Protocol (TCP) to convert packets having a TCP format into a different format;
create a path using the identified one or more routines;
process the packet using the created path; and
store the path for use in processing subsequent packets in the message; and
in response to determining that a path is currently stored for the key value;
process the packet using the stored path.

17. The apparatus of claim 16, wherein the apparatus is configured to process the packet by queuing the packet for the one or more routines identified in the path.

18. The apparatus of claim 16, wherein the different format is an application layer format.

19. The apparatus of claim 16, wherein the particular routine is executable to utilize state information stored within the path.

20. The apparatus of claim 16, wherein the path stores state information for at least some of the one or more routines.

* * * * *